(12) United States Patent
Kuwamura

(10) Patent No.: US 10,671,780 B2
(45) Date of Patent: Jun. 2, 2020

(54) INFORMATION PROCESSING DEVICE THAT EXECUTES SIMULATION AND A SIMULATION METHOD

(71) Applicant: Fujitsu Limited, Kawasaki-shi, Kanagawa (JP)

(72) Inventor: Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 885 days.

(21) Appl. No.: 15/299,509

(22) Filed: Oct. 21, 2016

(65) Prior Publication Data

US 2017/0177772 A1    Jun. 22, 2017

(30) Foreign Application Priority Data

Dec. 18, 2015 (JP) ................................ 2015-247976

(51) Int. Cl.
*G06F 9/44*  (2018.01)
*G06F 30/33* (2020.01)
(Continued)

(52) U.S. Cl.
CPC ............ *G06F 30/33* (2020.01); *G06F 9/4552* (2013.01); *G06F 2115/10* (2020.01)

(58) Field of Classification Search
CPC ..... G06F 9/4552; G06F 30/33; G06F 2115/10
See application file for complete search history.

(56) References Cited

U.S. PATENT DOCUMENTS 6,393,540 B1 * 5/2002 Blumenau ............... G06F 3/061
711/165

7,412,369 B1 * 8/2008 Gupta ................. G06F 11/3457
703/1
(Continued)

FOREIGN PATENT DOCUMENTS

JP     2013-84178 A     5/2013
JP     2013-222392 A    10/2013
(Continued)

OTHER PUBLICATIONS

Japanese Office Action dated May 28, 2019 for corresponding Japanese Patent Application No. 2015-247976, with English Abstract, 8 pages.
(Continued)

*Primary Examiner* — Lewis A Bullock, Jr.
*Assistant Examiner* — Tina Huynh
(74) *Attorney, Agent, or Firm* — Fujitsu Patent Center

(57) ABSTRACT

A simulation method executable by a computer that executes a simulation of an instruction execution of a program for a target processor, the method including: setting, to be a predicted result, an execution result of processing a memory access instruction; executing a functional simulation of an instruction execution based on an assumption of the predicted result, and obtaining timing information, so as to calculate an execution time for the memory access instruction in the case of the predicted result; generating and executing a host code; determining a type of memory to be accessed in the memory access instruction; and correcting an execution time for the memory access instruction in the case of the predicted result using a value corresponding to a result of determining the type of the memory, so as to obtain an execution time for the memory access instruction in the functional simulation.

3 Claims, 23 Drawing Sheets

(51) Int. Cl.
*G06F 9/455* (2018.01)
*G06F 115/10* (2020.01)

(56) References Cited

U.S. PATENT DOCUMENTS

| | | | | |
|---|---|---|---|---|
| 2009/0150135 | A1* | 6/2009 | Cressnnan | G06F 17/5022 |
| | | | | 703/13 |
| 2012/0124318 | A1* | 5/2012 | Bivens | G06F 11/3409 |
| | | | | 711/170 |
| 2013/0096903 | A1* | 4/2013 | Kuwamura | G06F 9/455 |
| | | | | 703/19 |
| 2013/0227534 | A1 | 8/2013 | Ike et al. | |
| 2014/0281240 | A1 | 9/2014 | Willhalm | |
| 2014/0316761 | A1* | 10/2014 | Thach | G06F 9/455 |
| | | | | 703/22 |
| 2014/0365735 | A1* | 12/2014 | Kuwamura | G06F 8/4442 |
| | | | | 711/144 |
| 2018/0024755 | A1* | 1/2018 | Hassan | G06F 11/36 |
| | | | | 711/112 |

FOREIGN PATENT DOCUMENTS

| | | |
|---|---|---|
| JP | 2014-153965 | 8/2014 |
| JP | 2014-182836 | 9/2014 |
| JP | 2014-241031 A | 12/2014 |
| WO | 2012049728 | 4/2012 |

OTHER PUBLICATIONS

Japanese Office Action dated Dec. 17, 2019 for corresponding Japanese Patent Application No. 2015-247976, with English Translation, 8 pages.

Takahashi, M. et al.,"Performance Evaluation of Fine Grain SIMD Processor", IEICE Technical Report, Institute of Electronics, Information and Communication Engineers, Aug. 20, 1992, vol. 92, No. 172, pp. 55-62, with Partial English Translation.

* cited by examiner

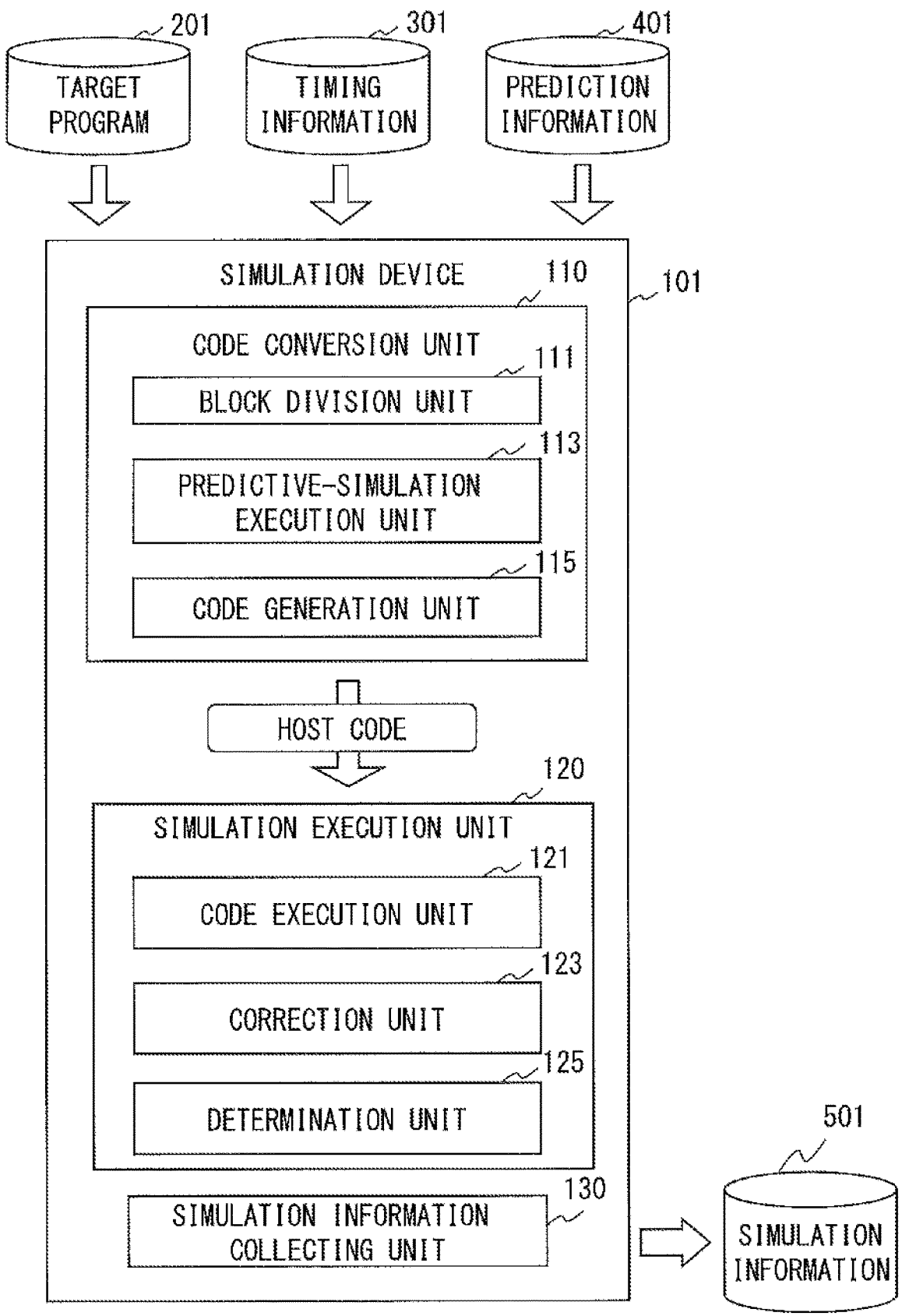
F I G. 2

```
LDR    [r1],  (r2;)           // [r1] → r2

MUL     r3,    r4,   (r5;)    // r3 * r4 → r5

ADD    (r2,) (r5,)   r6;      // r2+r5 → r6
```

| INSTRUCTION | SOURCE REGISTER | DESTINATION REGISTER | PENALTY |
|---|---|---|---|
| LDR | rs1:e1 | rd:e2 | CACHE MISS (DRAM) : 6<br>CACHE MISS (NVRAM) : 22 |
| MUL | rs1:e1,<br>rs2:e2 | rd:e3 | — |
| ADD | rs1:e1,<br>rs2:e1 | rd:e2 | — |

FIG. 4

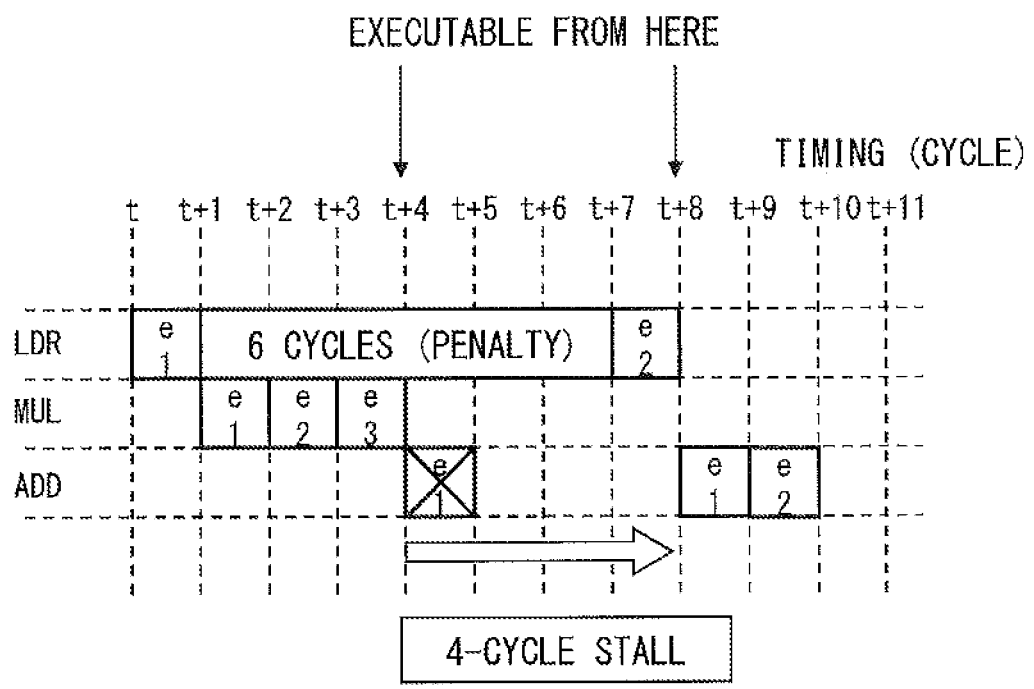
F I G. 5B

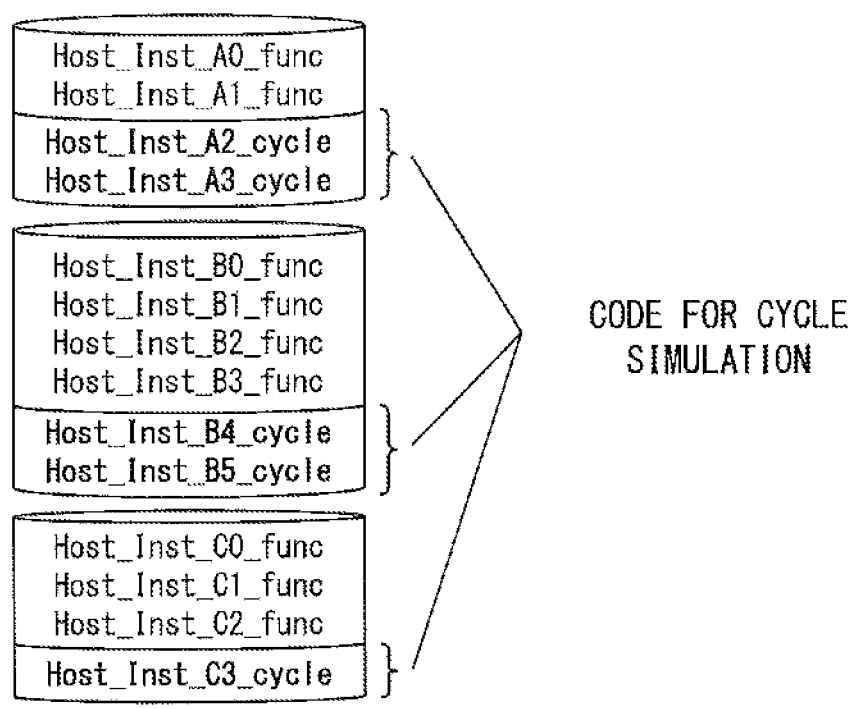
F I G. 6B

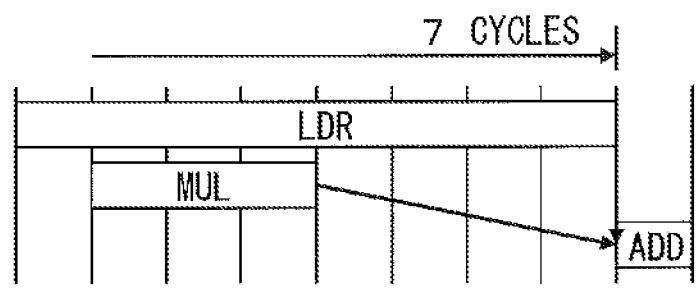
F I G. 1 0 B

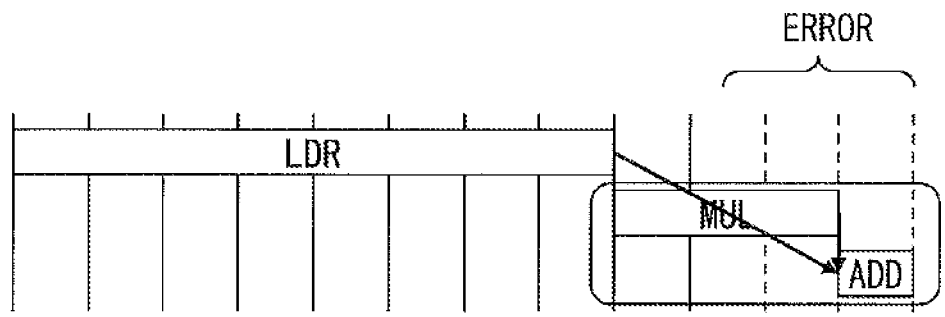
F I G. 10D

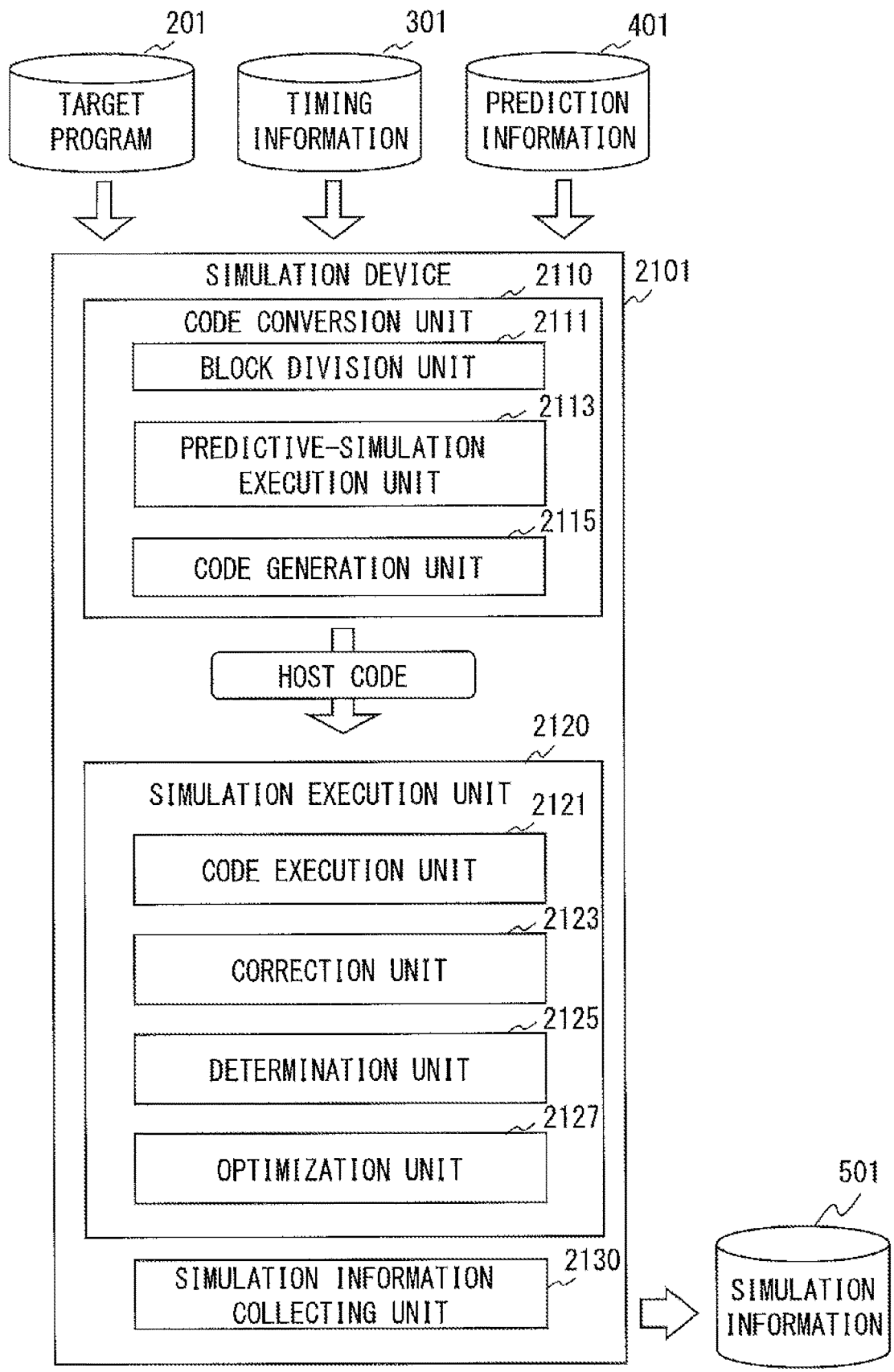
F I G. 1 1

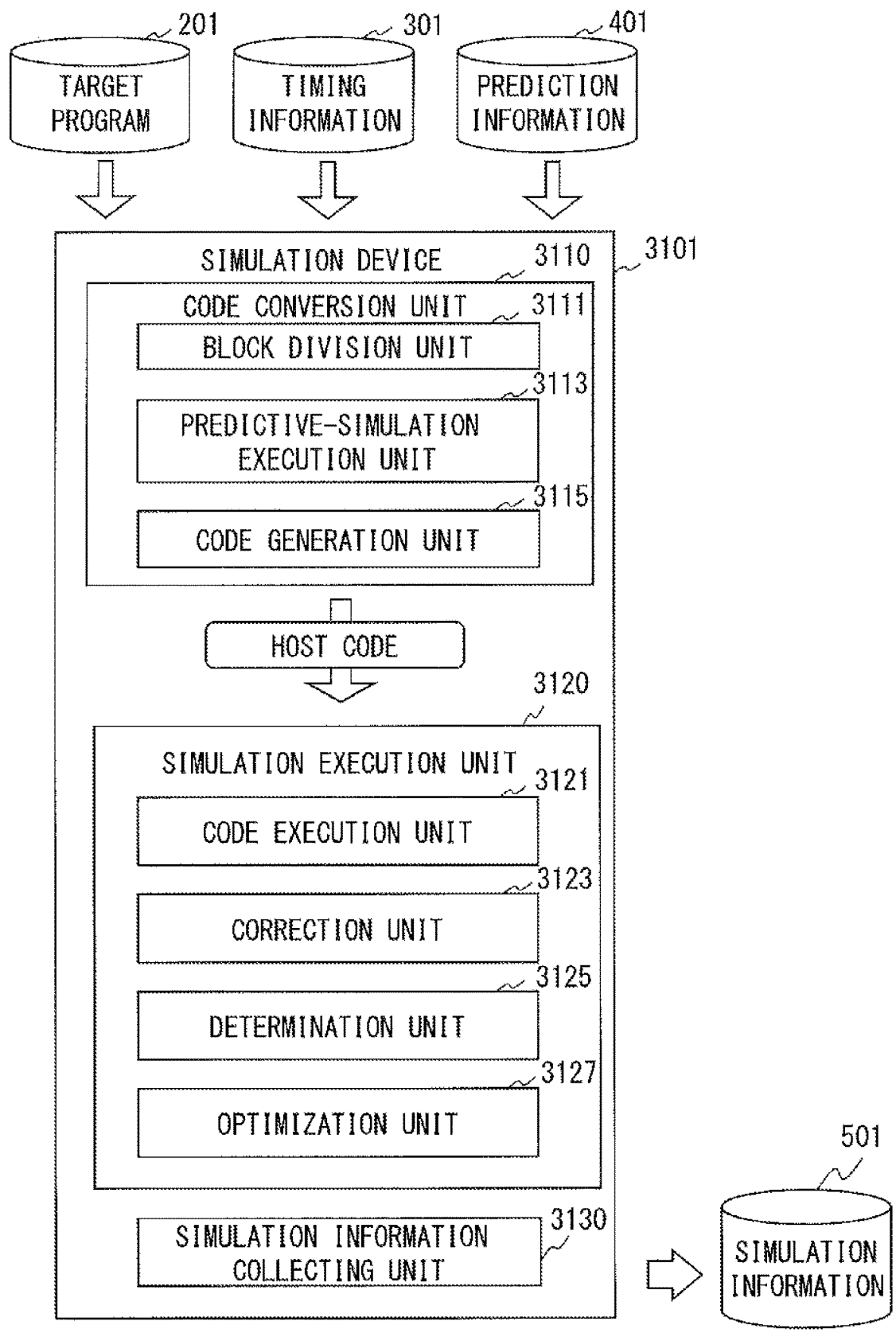
F I G. 1 5

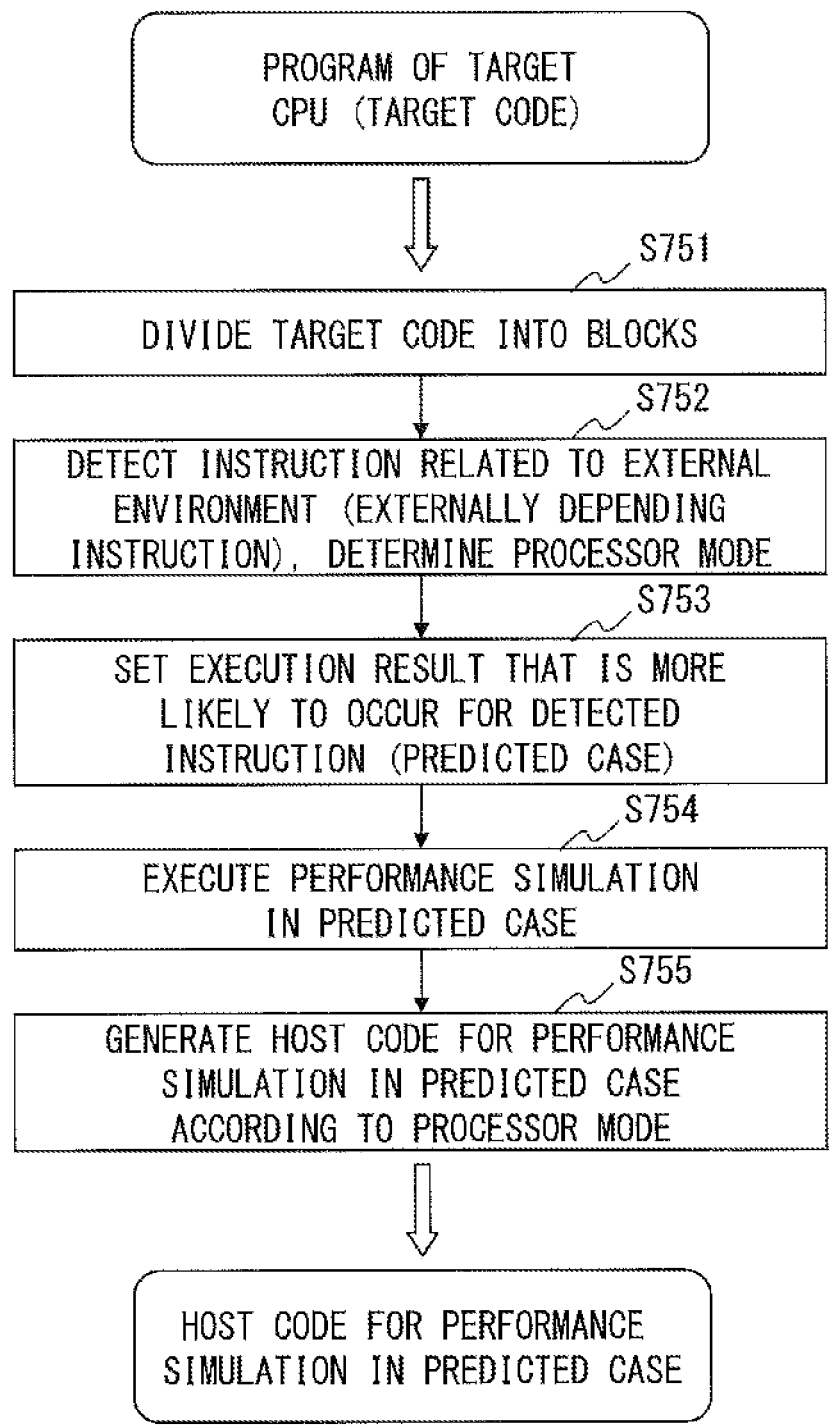
F I G. 1 6

INFORMATION PROCESSING DEVICE THAT EXECUTES SIMULATION AND A SIMULATION METHOD

CROSS-REFERENCE TO RELATED APPLICATION

This application is based upon and claims the benefit of priority of the prior Japanese Patent Application No. 2015-247976, filed on Dec. 18, 2015, the entire contents of which are incorporated herein by reference.

FIELD

The embodiments discussed herein are related to an information processing device that executes a simulation and to a simulation method.

BACKGROUND

For executing a simulation on a function, a performance, or a power consumption, an interpreter scheme or a just-in-time (JIT) compiler scheme is known as a method for converting an instruction code of a target CPU to be evaluated (a target code) into an instruction code of a host CPU (a host code).

When a simulation is executed in the JIT compiler scheme, an instruction of a target CPU which appears in an executing program is replaced with an instruction of a host CPU that executes a simulation, and after that, the replacement instruction is executed, the target CPU being a simulation target. Thus, the processing in the JIT compiler scheme is performed at a higher speed than the processing by the interpreter scheme, and the JIT compiler scheme has been used in a performance simulation of a CPU when a high-speed performance is particularly needed. A CPU performance simulation on a CPU using the JIT compiler scheme has been proposed.

A simulation device is known that is able to execute a performance simulation on a CPU at high speed (see, for example, International Publication Pamphlet No. WO2012/049728).

A high-density, high-speed, and byte-accessible (accessible in a load/store instruction) non-volatile random access memory (NVRAM) has been developed. As a non-volatile random access memory, there exists a phase change random access memory (PCM), a resistance random access memory (ReRAM), and a magnetoresistive random access memory (MRAM). There has emerged a hybrid memory system that uses both a volatile memory (such as a dynamic random access memory: DRAM) and a non-volatile random access memory as main memories.

A conventional performance simulation is executed on the assumption that one type of memory is used as a memory, so it is difficult to execute a performance simulation on a hybrid memory system that uses two types of memories (such as a DRAM and an NVRAM) as main memories.

Furthermore, documents such as Japanese Laid-open Patent Publication No. 2014-182836, Japanese Laid-open Patent Publication No. 2014-153965, etc. are well known.

SUMMARY

According to an aspect of the invention, a non-transitory computer-readable recording medium having stored therein a simulation program that causes a computer to execute a process that includes a simulation of an instruction execution of a program for a target processor, the process including: setting, to be a predicted result, an execution result of processing a memory access instruction that is included in a code of the program; executing a functional simulation of an instruction execution based on the assumption of the predicted result, and obtaining timing information that indicates a timing of executing the memory access instruction, so as to calculate an execution time for the memory access instruction in the case of the predicted result, on the basis of a result of the functional simulation and the timing information; generating a host code on the basis of the result of the functional simulation, the host code including the memory access instruction and being used to execute a performance simulation of an instruction execution based on the assumption of the predicted result; executing the generated host code; determining a type of memory to be accessed in the memory access instruction when a result of executing a cache access in the memory access instruction included in the host code is different from the predicted result; and correcting an execution time for the memory access instruction in the case of the predicted result using a correction value corresponding to a result of determining the type of the memory, so as to obtain an execution time for the memory access instruction in the functional simulation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a configuration of a simulation device according to a first embodiment;

FIG. 3 illustrates examples of instructions included in a block;

FIG. 4 illustrates an example of timing information;

FIG. 5B illustrates an example of the timing of executing each of the instructions illustrated in FIG. 3;

FIG. 6B illustrates an example in which a code for cycle simulation is incorporated into the host code of a functional simulation;

FIG. 10B illustrates the example of the correction for the result of executing the LDR instruction, the correction being performed by the correction unit;

FIG. 10D illustrates an example of a conventional correction for a result of executing the LDR instruction;

FIG. 11 is a configuration of a simulation device according to a second embodiment;

FIG. 15 is a configuration of a simulation device according to a third embodiment;

FIG. 16 is a flowchart of processing of generating a host code that is performed in the simulation device according to the third embodiment.

DESCRIPTION OF EMBODIMENTS

Embodiments will now be described with reference to the drawings.

First, a hybrid memory system including a CPU that is a simulation target (a target CPU) in the embodiments is described.

The hybrid memory system is a system that uses both a volatile memory and a non-volatile random access memory (NVRAM) as main memories. The CPU can access a main memory using a load instruction and a store instruction. The volatile memory is, for example, a DRAM. The non-volatile random access memory is, for example, a phase change random access memory (PCM), a resistance random access memory (ReRAM), or a magnetoresistive random access memory (MRAM).

Figure 1A:
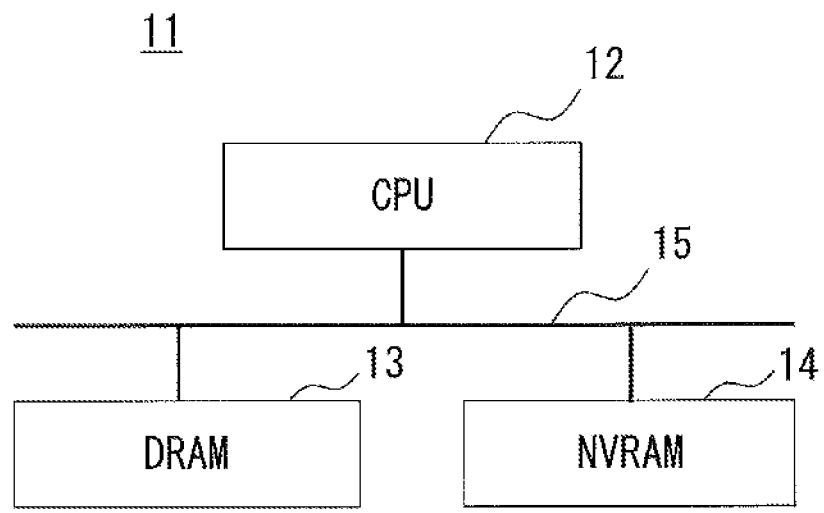
FIG. 1A is an example of a configuration of a hybrid memory system (part 1)

FIG. 1A is an example of a configuration of the hybrid memory system (part 1).

A hybrid memory system 11 includes a CPU 12, a DRAM 13, and an NVRAM 14. The CPU 12, the DRAM 13, and the NVRAM 14 are connected to one another through a bus 15.

The CPU 12 has a cache (not illustrated), and when it reads data, the CPU 12 reads the data from the cache if the data is stored in the cache. The CPU 12 reads the data from the DRAM 13 or the NVRAM 14 if the data is not stored in the cache.

Figure 1B:
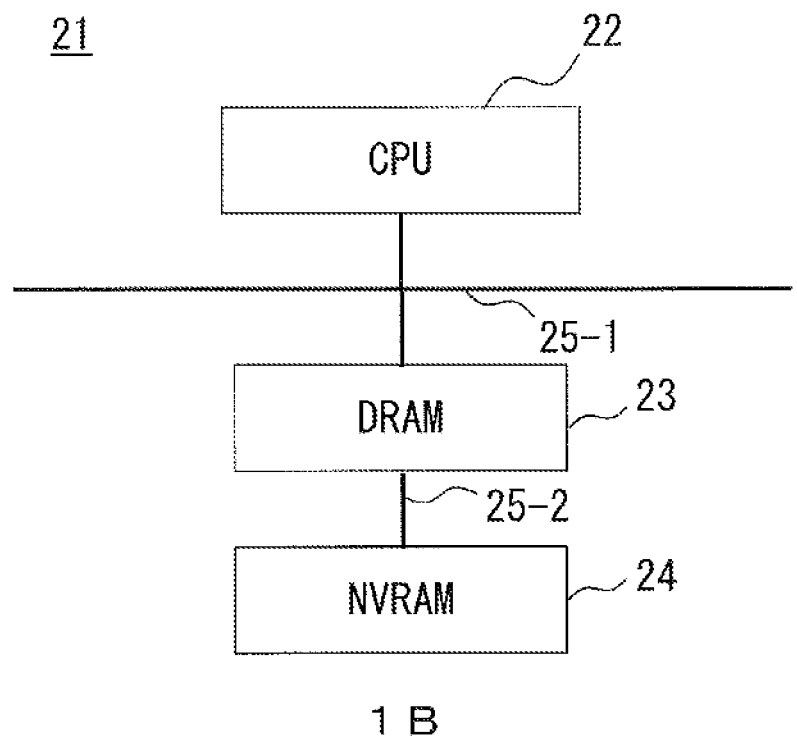
FIG. 1B is an example of the configuration of the hybrid memory system (part 2)

FIG. 1B is an example of the configuration of the hybrid memory system (part 2).

A hybrid memory system 21 includes a CPU 22, a DRAM 23, and an NVRAM 24. The CPU 22 and the DRAM 23 are connected to each other through a bus 25-1, and the DRAM 23 and the NVRAM 24 are connected to each other through a bus 25-2. The DRAM 23 operates as a cache of the NVRAM 24 in the hybrid memory system 21.

The CPU 22 has a cache (not illustrated), and when it reads data, the CPU 22 reads the data from the cache if the data is stored in the cache. The CPU 22 reads the data from the DRAM 23 or the NVRAM 24 if the data is not stored in the cache.

First Embodiment

FIG. 2 is a configuration of a simulation device according to a first embodiment.

A simulation device 101 is a device that executes a performance simulation of an instruction execution performed in a target CPU that controls pipeline processing. The simulation device 101 is, for example, an information processing device of, for example, a server or a personal computer (PC).

The target CPU is a control model of a CPU that is a simulation target. The simulation device 101 outputs cycle simulation information on each instruction as a performance simulation of an instruction execution performed in the target CPU.

Here, the target CPU is, for example, a CPU of the ARM architecture. The simulation device 101 that corresponds to a host CPU is, for example, a computer provided with a CPU of x86 architecture. It is assumed that, in the embodiments, the target CPU is a CPU provided in a hybrid memory system.

The simulation device 101 has a code conversion unit 110, a simulation execution unit 120, and a simulation information collecting unit 130.

The code conversion unit 110 is a processing unit that generates a code of a host CPU (a host code) that executes a simulation from a code of a program executed by the target CPU (a target code), the code of the host CPU being generated when the target CPU executes the program.

The code conversion unit 110 has a block division unit 111, a predictive-simulation execution unit 113, and a code generation unit 115.

The block division unit 111 divides, into prescribed blocks, a target code of a program which is input to the simulation device 101. The block unit for division may be, for example, a general basic block unit (from a code of a certain branch to a code just before a next branch), or any predetermined code unit.

Figure 3:
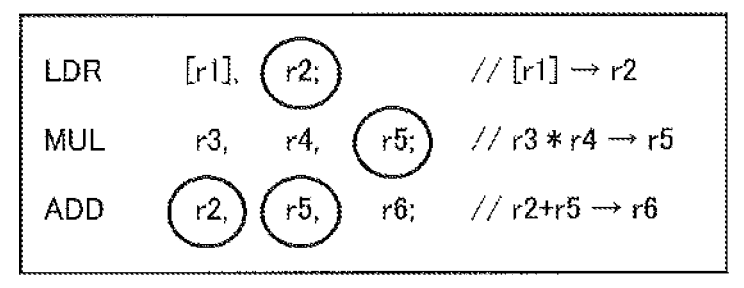

FIG. 3 illustrates examples of instructions included in a block.

It is assumed that, as illustrated in FIG. 3, a certain block includes the following three instructions of a target code: (1) "LDR [r1],r2" (load); (2) "MUL r3,r4, r5" (multiplication); and (3) "ADD r2,r5, r6" (addition) and they are input to a pipeline of the target CPU in the order of (1) to (3) so as to be executed. r1 to r6 in each of the instructions each represent a register (an address).

The predictive-simulation execution unit 113 is a processing unit that obtains timing information 301 and prediction information 401 so as to execute a performance simulation that executes an input block under a condition based on a certain execution result.

The timing information 301 includes, for each instruction of a target code, information indicating a correspondence between each processing element (stage) and a usable register upon executing an instruction, and information indicating a penalty time (the number of penalty cycles) that determines a delay time corresponding to the execution result for each externally depending instruction from among the instructions of the target code.

The externally depending instruction is an instruction that performs processing related to an external environment, such as processing in which a result of executing an instruction such as a memory access instruction depends on an external environment outside a target CPU, the memory access instruction including a load instruction or a store instruction. Examples of such processing are processing of an instruction cache, a data cache, or a TLB search and processing of a branch prediction or a stack of a call/return.

FIG. 4 illustrates an example of the timing information 301.

With respect to an LDR instruction, the timing information 301 of FIG. 4 indicates that a source register rs1 (r1) can be used for the first processing element (e1) and a destination register rd (r2) can be used for the second processing element (e2). The timing information 301 includes information that indicates a penalty at the time of a cache miss with respect to the LDR instruction. Specifically, the timing information 301 includes pieces of information that indicate penalties (a cycle) when the main memory to be accessed by a target CPU at the time of a cache miss is a DRAM and when it is an NVRAM, respectively. In the timing information 301 of FIG. 4, the penalty is 6 cycles when the main memory to be accessed by the target CPU at the time of a cache miss is a DRAM, and the penalty is 22 cycles when it is an NVRAM.

With respect to a MUL instruction, the timing information 301 of FIG. 4 indicates that a first source register rs1 (r3) can be used for the first processing element (e1), a second source register rs2 (r4) can be used for the second processing element (e2), and a destination register rd (r5) can be used for the third processing element (e3), respectively. With respect to an ADD instruction, the timing information 301 of FIG. 4 indicates that a first source register rs1 (r2) and a second source register rs2 (r5) can be used for the first processing element (e1), and a destination register rd (r6) can be used for the second processing element (e2).

Figure 5A:
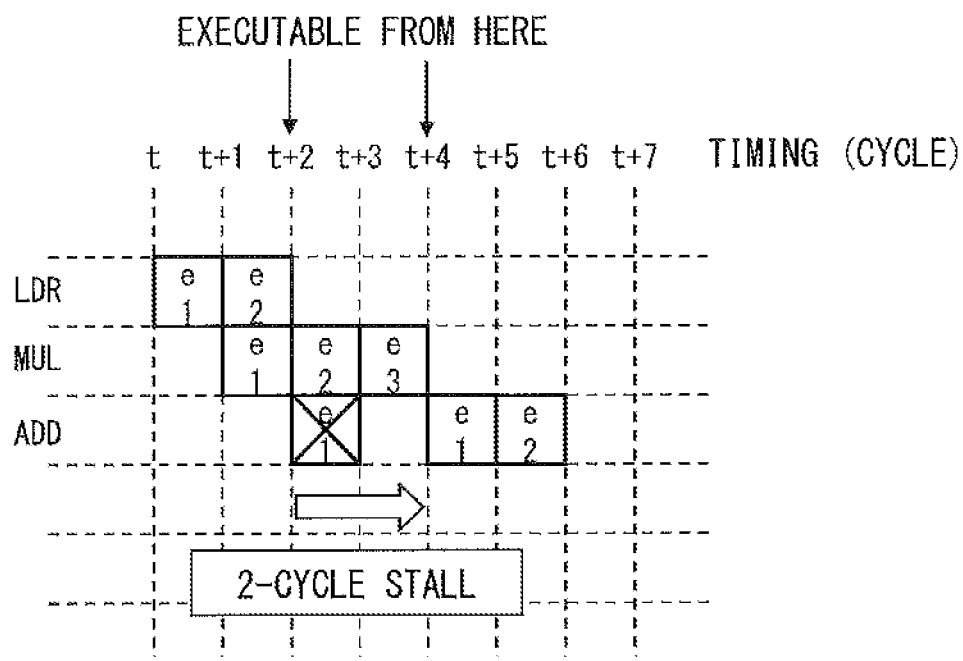
FIG. 5A illustrates an example of a timing of executing each of the instructions illustrated in FIG. 3.

FIGS. 5A and 5B illustrate examples of a timing of executing each of the instructions in the block illustrated in FIG. 3.

As illustrated in the timing information 301 of FIG. 4, with respect to a timing at which each of the instructions is input to the pipeline, it is a timing t+1 for the MUL instruction and it is a timing t+2 for the ADD instruction if the LDR instruction starts to be executed at a timing t.

The first source register (r2) and the second source register (r5) of the ADD instruction are used in the LDR instruction and the MUL instruction, so the ADD instruction starts to be executed after a timing t+4 at which the executions of the LDR instruction and the MUL instruction are completed, which results in causing a 2-cycle waiting time (a 2-cycle stall).

Thus, as can be seen in FIG. 5A, when a simulation is executed on the block illustrated in FIG. 3, the execution time for the block is 6 cycles if a result of executing the LDR instruction is a cache hit.

FIG. 5B illustrates an example of a timing when a result of executing the LDR instruction in the block illustrated in FIG. 3 is a cache miss.

If a result of executing the LDR instruction is a cache miss and the main memory to be accessed by the CPU is a DRAM, an arbitrary time that is considered sufficient for performing a re-execution is set to be a penalty (here, a 6-cycle penalty) in the timing information 301, so this penalty cycle is added as a delay time. Thus, the execution of the second processing element (e2) is delayed until a timing t+7. The MUL instruction that is to be executed next after the LDR instruction is executed with no change without being affected by the delay, but the ADD instruction is executed after a timing t+8 at which the execution of the LDR instruction is completed, which results in causing a 4-cycle waiting time (a 4-cycle stall).

Thus, as can be seen in FIG. 5B, when a simulation is executed on the instruction execution of the block illustrated in FIG. 3, the execution time is 10 cycles if a result of executing the LDR instruction is a cache miss and the main memory to be accessed by the CPU is a DRAM.

The prediction information 401 is information in which an execution result (predicted result) is set that is more likely to occur when an externally depending instruction of a target code is processed. For example, the following pieces of information are set to be the prediction information 401.

Instruction cache: prediction=hit
Data cache: prediction=hit
TLB search: prediction=hit
Branch prediction: prediction=hit
Call/return: prediction=hit The predictive-simulation execution unit 113 sets, on the basis of the above-described prediction information 401, a predicted result for an externally depending instruction included in an input block, refers to the timing information 301, and executes an instruction based on the assumption of the set predicted result (predicted case), so as to execute a simulation on the progress of the instruction execution. As a simulation result, the predictive-simulation execution unit 113 obtains an execution time (the number of cycles needed) for each instruction included in the block.

The code generation unit 115 is a processing unit that generates a host code (a host code for performance simulation) on the basis of a result of the simulation performed by the predictive-simulation execution unit 113, the host code corresponding to the processed block and being used to execute a performance simulation upon executing an instruction in the set predicted case.

The code generation unit 115 generates, on the basis of the target code of the block, a host code used to execute an instruction in a predicted case in which the externally depending instruction corresponds to the predicted result, adds an execution time for each instruction, and incorporates a code for simulation that performs processing of calculating the time to process the block.

For example, with respect to processing for which "cache hit" is set to be a predicted result for an LDR instruction of data, the code generation unit 115 generates a host code that simulates a processing execution when a cache access made by the LDR instruction in the block is "hit" so as to obtain an execution time in this predicted case, and generates a host code that performs correction calculation so as to obtain an execution time when a cache access made by the LDR instruction is "miss", the correction calculation using an addition to the execution time in the predicted case "hit".

The simulation execution unit 120 is a processing unit that executes a host code generated by the code generation unit 115 so as to perform functional and performance simulations of an instruction execution performed in a target CPU that executes a program (target code).

The simulation execution unit 120 includes a code execution unit 121, a correction unit 123, and a determination unit 125.

The code execution unit 121 is a processing unit that executes a program (target code) using a host code.

When a result of executing an externally depending instruction is different from a set predicted result (unpredicted case), the correction unit 123 corrects an already-obtained execution time in a predicted case during an execution of a program, so as to obtain an execution time for the instruction on the basis of a result of the determination performed by the determination unit 125.

The correction unit 123 performs a correction using, for example, a penalty time given to an externally depending instruction, execution times for instructions executed before and after the externally depending instruction, and a delay time of the immediately precedent instruction. The detailed correction processing will be described later.

When a result of executing an externally depending instruction is different from a set predicted result (unpredicted case), the determination unit 125 determines the type of main memory to be accessed by a target CPU during an execution of a program.

The simulation information collecting unit 130 collects simulation information 501 that includes an execution time for each instruction as a result of executing a performance simulation.

A flow of processing performed in the simulation device 101 is described below.

[Code Conversion Processing]

(1) The block division unit 111 of the code conversion unit 110 of the simulation device 101 obtains a target code of a target program 201 so as to hold the target code in a storage (not illustrated in FIG. 2), and divides the held target code into arbitrary blocks (see FIG. 3).

(2) The predictive-simulation execution unit 113 obtains the timing information 301 and the prediction information 401 that are related to the input target program 201 and stores them in the storage.

Then, the predictive-simulation execution unit 113 sets a predicted result for an externally depending instruction of each of the blocks obtained by the division, on the basis of the prediction information 401. For example, the predictive-simulation execution unit 113 sets "hit" to be a predicted result for a data cache of the LDR instruction from among the instructions in the block illustrated in FIG. 4.

(3) The predictive-simulation execution unit 113 interprets the code of a block and executes a simulation of an instruction execution based on the assumption of the set predicted result. In other words, the predictive-simulation execution unit 113 executes a simulation of the instruction execution in the timing example illustrated in FIG. 5A.

(4) Next, the code generation unit 115 generates a host code from the target code on the basis of a result of the simulation in the predicted case. Further, the code generation unit 115 incorporates a code for cycle simulation into the host code (only a function code) obtained by converting the target code, the code for cycle simulation being used to execute a performance simulation (cycle simulation).

Figure 6A:
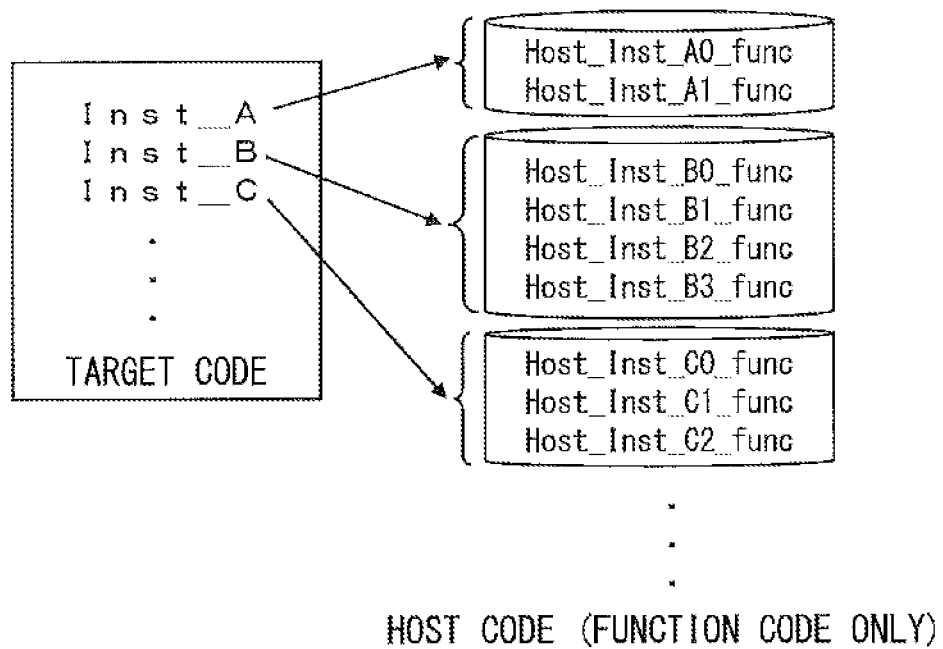
FIG. 6A illustrates an example in which a host code of a functional simulation is generated from a target code.

FIG. 6A illustrates an example in which a host code of a functional simulation is generated from a target code, and FIG. 6B illustrates an example in which a code for cycle simulation is incorporated into the host code of a functional simulation.

As illustrated in FIG. 6A, a target code Inst_A is converted into host codes Host_Inst_A0_func and Host_Inst_A1 func, a target code Inst_B is converted into host codes Host_Inst_B0_func, Host_Inst_B1_func, Host_Inst_B2_func, . . . , so that host codes that are only function codes are generated.

Further, codes for cycle simulation that correspond to the target code Inst_A, that is, Host_Inst_A2_cycle and Host_Inst_A3_cycle, and codes for cycle simulation that correspond to the target code Inst_B, that is, Host_Inst_B4_cycle and Host_Inst_B5_cycle, are respectively incorporated into the host codes that are only functional codes.

The code for cycle simulation is a code that quantifies an execution time (the number of cycles needed) for each instruction and sums the execution times for all of the instructions so as to obtain the time to process a block. This permits obtaining of information that indicates the progress during an execution of the block.

Here, from among the host codes, a functional code and a code for cycle simulation with respect to an instruction other than an externally depending instruction can be executed using a known code, so their specific descriptions are omitted. The code for cycle simulation is provided as a helper function calling instruction that calls a helper function that performs correction processing. The helper function will be described later.

[Simulation Processing]

(1) The code execution unit 121 of the simulation execution unit 120 executes a performance simulation of the target program 201 using a host code generated by the code conversion unit 110.

The code execution unit 121 performs a simulation of an instruction execution of the target program 201 so as to obtain an execution time for each instruction.

(2) When the code execution unit 121 detects an externally depending instruction (such as an LDR instruction) during the execution of the simulation, the correction unit 123 is called.

(3) The correction unit 123 determines whether a result of executing the externally depending instruction is different from a set predicted result, and performs a correction when the execution result is different from the predicted result. For example, when an instruction "LDR [r1],r2" is detected and when a predicted result for a data cache (cache hit) and an actual execution result (cache miss) are different, the correction unit 123 corrects the execution time (the number of cycles) for the detected instruction "LDR [r1],r2". Further, the correction unit 123 also changes a timing t+n of executing a next instruction by this correction.

The correction unit 123 corrects an execution time for an instruction every time a result of executing an externally depending instruction that is different from a predicted result is obtained. Here, the execution time for an externally depending instruction in a predicted case has been already qualified, so the correction unit 123 is able to calculate an execution time for the externally depending instruction in an unpredicted case by just performing addition or subtraction of values of, for example, a penalty time for the externally depending instruction, an execution time for an instruction performed before and after the externally depending instruction, and a delay time of the immediately precedent instruction.

Figure 7:
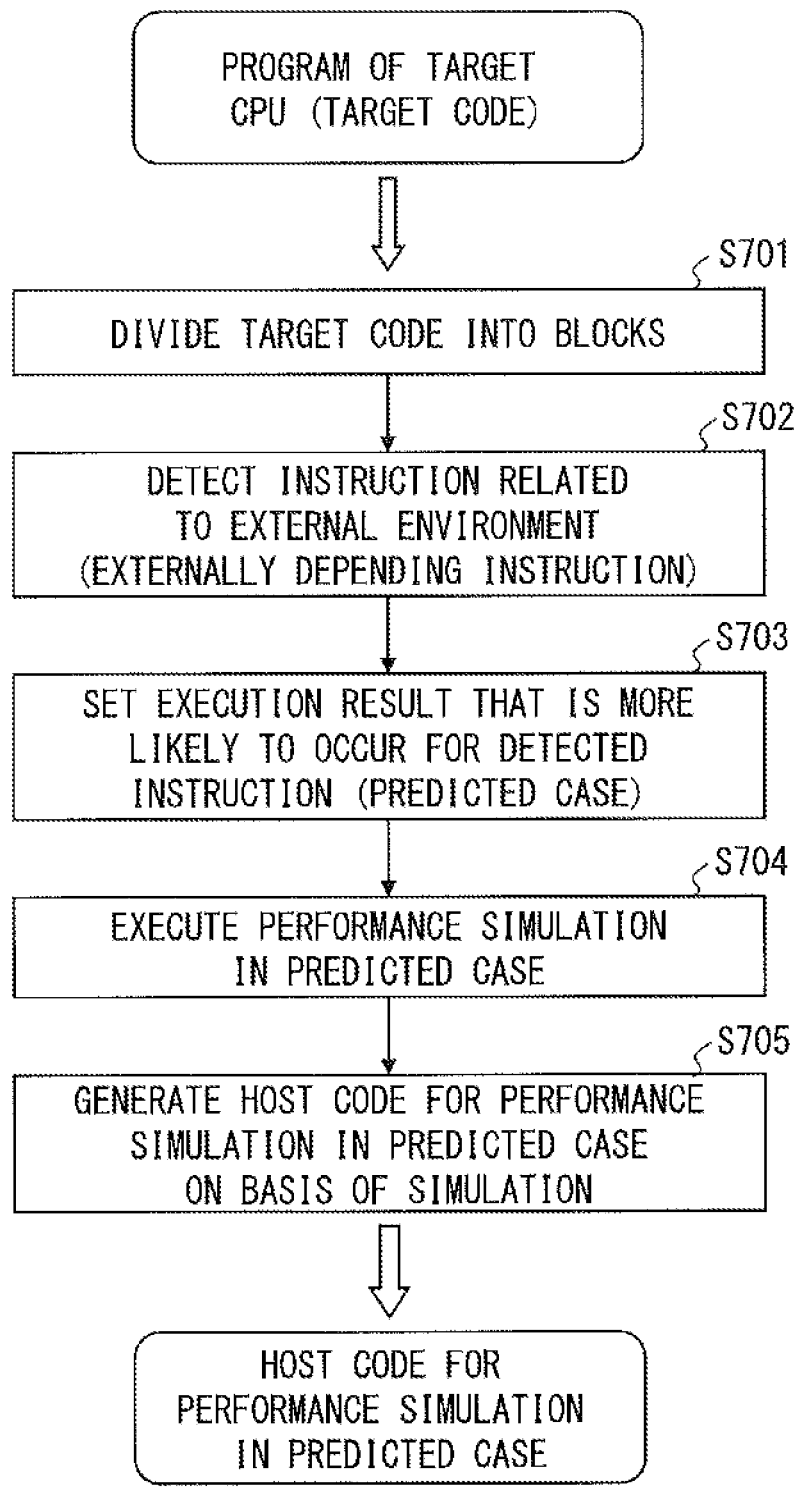
FIG. 7 is a flowchart of processing of generating a host code that is performed in the simulation device according to the first embodiment.

FIG. 7 is a flowchart of processing of generating a host code that is performed in the simulation device according to the first embodiment.

In Step S701, the block division unit 111 divides a code of a target program (target code) into a prescribed unit of blocks.

In Step S702, the predictive-simulation execution unit 113 analyzes instructions in a block so as to detect an externally depending instruction.

In Step S703, with respect to each of the detected instructions, the predictive-simulation execution unit 113 determines, to be a predicted case, an execution result that is more likely to occur, on the basis of the prediction information 401.

In Step S704, the predictive-simulation execution unit 113 refers to the timing information 301 so as to execute a performance simulation based on the assumption of the execution result set to be a predicted result for each of the instructions in the block.

In Step S705, the code generation unit 115 generates a host code for performance simulation on the basis of a simulation result, the host code for performance simulation being executed by the simulation execution unit 120.

A host code in which a code that executes a simulation on a performance of a target CPU has been incorporated into a functional code in the case of the set execution result (predicted case) is output by performing the processes of Steps S701 to S705 described above.

Figure 8:
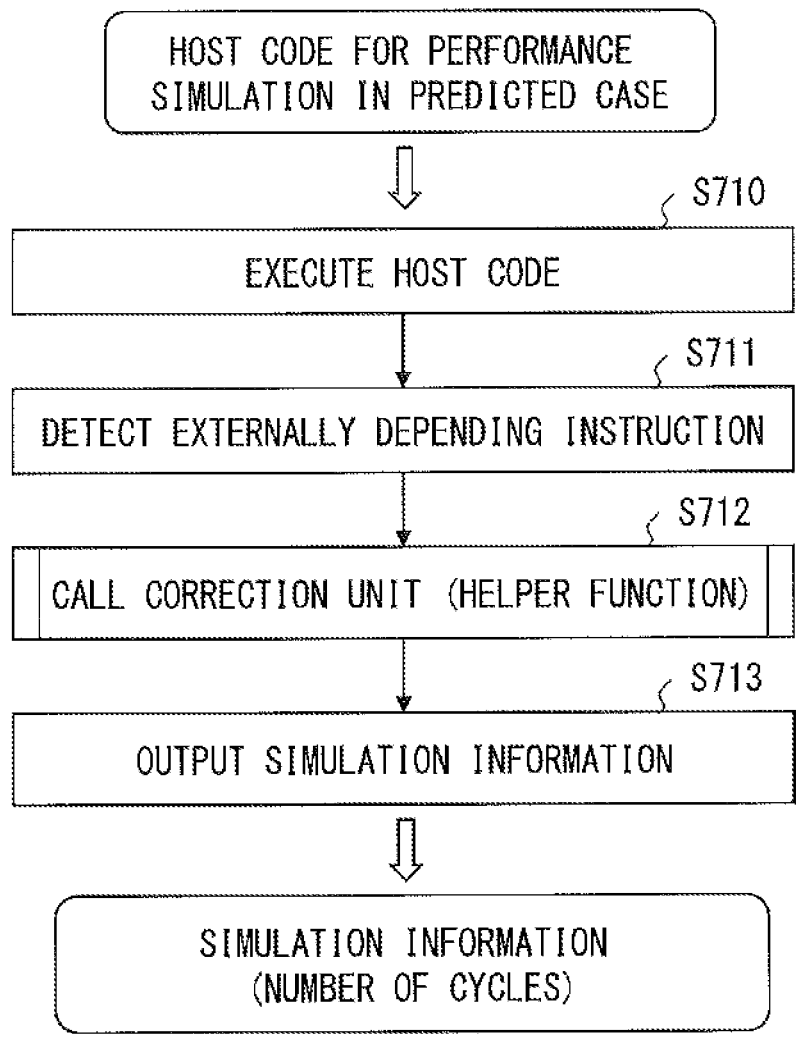
FIG. 8 is a flowchart of simulation processing performed in the simulation device according to the first embodiment.

FIG. 8 is a flowchart of simulation processing performed in the simulation device according to the first embodiment.

In Step S710, the code execution unit 121 executes the host code generated by the code generation unit 115 so as to execute a performance simulation.

In Step S711, the code execution unit 121 detects an externally depending instruction during execution.

In Step S712, the code execution unit 121 performs processing of calling a correction unit (helper function). The detailed processing of calling a correction unit (helper function) will be described later.

In Step S713, the simulation information collecting unit 130 outputs the simulation information 501 that is information about the simulation processing performed on all of the host codes corresponding to the target program.

The simulation information (cycle simulation information) 501 on the target CPU that executes the target program 201 is output by performing the processes of Steps S710 to S713 described above.

Figure 9:
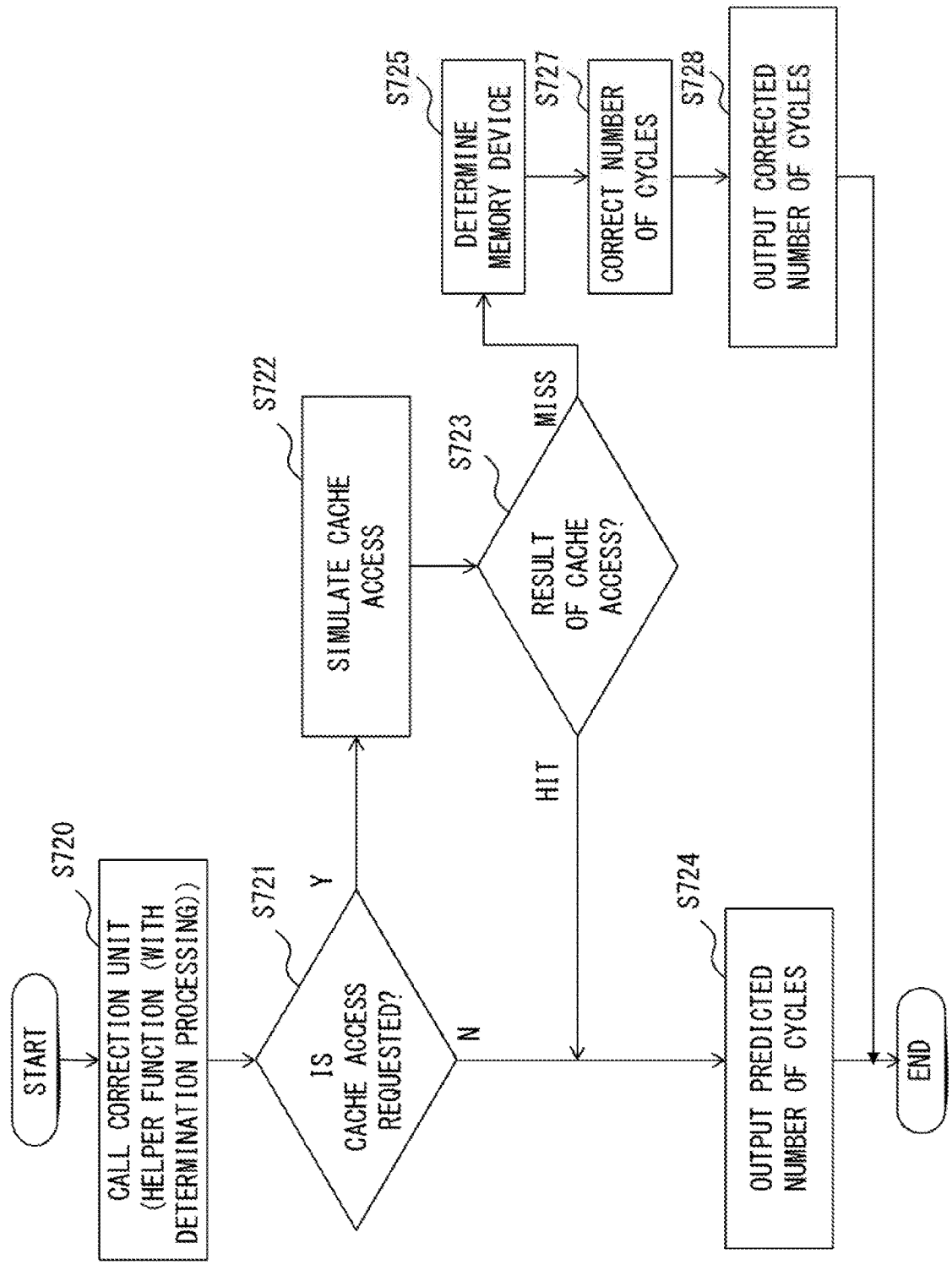
FIG. 9 is a detailed flowchart of processing of calling a correction unit (helper function) according to the first embodiment.

FIG. 9 is a detailed flowchart of the processing of calling a correction unit (helper function) according to the first embodiment. FIG. 9 illustrates processing of determining and correcting a predicted result for processing of a load (LDR) instruction, that is, a memory access instruction that is an example of an externally depending instruction.

FIG. 9 corresponds to Step S712 of FIG. 8.

In Step S720, the code execution unit 121 calls a helper function designated by a helper function calling instruction. In the first embodiment, a helper function (with determination processing) is called, and the processes of S721 to S725, S727, and S728 described below are performed by the helper function (with determination processing).

In Step S721, the code execution unit 121 determines whether a cache access is requested by an LDR instruction. The control moves on to Step S722 when a cache access is requested, and the control moves on to Step S724 when a cache access is not requested.

In Step S722, the correction unit 123 simulates a cache access.

In Step S723, the correction unit 123 determines a result of the cache access simulated in Step S722. The control moves on to Step S724 when the result of the cache access is "cache hit", and the control moves on to Step S725 when the result of the cache access is "cache miss". In FIG. 9, the case in which the predicted case is "cache hit" is described.

In Step S724, the correction unit 123 outputs an uncorrected predicted execution time (the number of cycles).

In Step S725, the determination unit 125 determines the type of memory device (main memory) to be accessed by the target CPU at the time of a cache miss. The type of memory device is determined on the basis of the address of the cache upon simulating the cache access. The determination unit 125 determines, for example, that the memory device is a DRAM or that the memory device is an NVRAM.

In Step S727, the correction unit 123 corrects the execution time (the number of cycles) for the LDR instruction on the basis of a result of determining a memory device and the timing information 301. For example, when the result of determining a memory device is a DRAM, the correction unit 123 corrects the execution time (the number of cycles) using 6 cycles because the timing information 301 of FIG. 4 indicates "cache miss (DRAM): 6". Further, when the result of determining a memory device is a NVRAM, the correction unit 123 corrects the execution time (the number of cycles) using 22 cycles because the timing information 301 of FIG. 4 indicates "cache miss (NVRAM): 22".

In Step S728, the correction unit 123 outputs the corrected execution time (the corrected number of cycles).

Figure 10A:
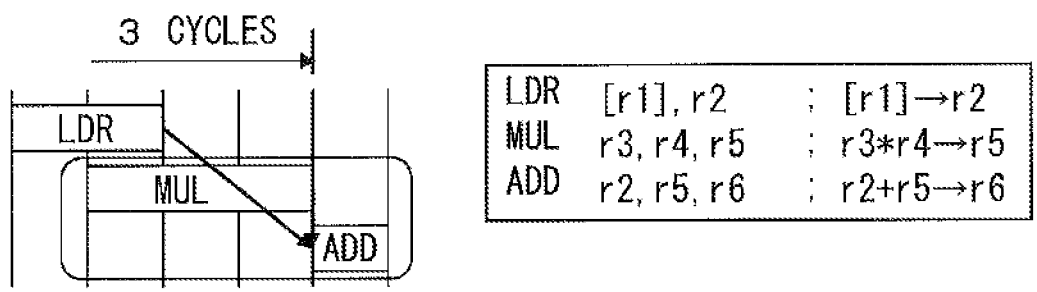
FIG. 10A illustrates an example of a correction for a result of executing an LDR instruction, the correction being performed by the correction unit.
Figure 10C:
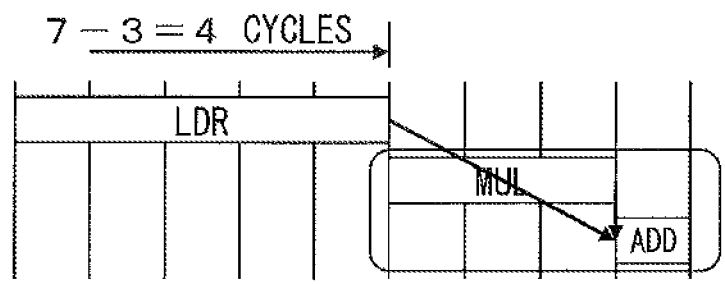
FIG. 10C illustrates the example of the correction for the result of executing the LDR instruction, the correction being performed by the correction unit.

FIGS. 10A to 10C illustrate an example of a correction for a result of executing an LDR instruction, the correction being performed by the correction unit 123. FIG. 10D illustrates an example of a conventional correction for a result of executing the LDR instruction.

FIGS. 10A to 10D are diagrams for explaining examples of corrections when one cache miss has occurred in the case in which one cache processing is performed.

In the examples of FIGS. 10A to 10D, a simulation is executed on the following three instructions.

LDR [r1],r2:[r1]→r2;
MUL r3,r4,r5:r3*r4→r5;
ADD r2,r5,r6:r2+r5→r6

FIG. 10A illustrates an example of a chart of a timing of executing an instruction when the predicted result is "cache hit". In this predicted case, there occurs a 2-cycle stall in the ADD instruction that is executed thirdly.

FIG. 10B illustrates an example of a chart of a timing of executing an instruction in the case of "cache miss" that is different from the predicted result. In this miss-predicted case, there occurs a delay by a penalty cycle (6 cycles) when the result of executing the LDR instruction is a cache miss. Thus, the MUL instruction is executed without being affected by the delay, but the ADD instruction is executed after the execution of the LDR instruction is completed, so it is delayed by 4 cycles.

FIG. 10C illustrates an example of a chart of a timing of executing an instruction after a correction performed by the correction unit 123. It is assumed that the type of memory device that is an access destination of a target CPU at the time of a cache miss has been determined to be a DRAM.

The result of executing the LDR instruction is a cache miss (miss-predicted result), so the correction unit 123 adds a prescribed penalty time at the time of a cache miss (6 cycles) to the remaining execution time (2−1=1 cycle) so as to obtain a valid delay time (7 cycles). The valid delay time corresponds to a maximum delay time. Here, 6 cycles are added as a penalty time because the type of memory device that is the access destination of the target CPU at the time of a cache miss has been determined to be a DRAM.

Further, the correction unit 123 obtains an execution time (3 cycles) for the MUL instruction that is a next instruction, determines that the execution time for the next instruction does not exceed the delay time, and subtracts the execution time for the next instruction from the valid delay time so as to obtain an execution time for the LDR instruction in which a delay has occurred (a delay time) (7−3=4 cycles).

Furthermore, the correction unit 123 subtracts the above-described delay time from the valid delay time so as to obtain an allowed time (3 cycles). The allowed time is a time for which a delay as a penalty is allowed.

As a result of this correction, the execution time for the LDR instruction is changed to an execution time (1+4=5 cycles) obtained by adding the delay time to the time for which the execution has been performed, and the execution times for the MUL instruction and the ADD instruction that are the subsequent instructions are calculated starting at a timing t1 at which the execution of the LDR instruction is completed.

In other words, the execution time for this block (the number of cycles) can be obtained by just adding, to the corrected execution time for the LDR instruction (5 cycles), the respective execution times for the MUL instruction and the ADD instruction (3 cycles and 3 cycles) that are obtained as a result of processing performed by the predictive-simulation execution unit 113 (a result obtained by performing a predictive simulation using a predicted result).

Thus, it is also possible to accurately obtain the number of cycles for executing a simulation at the time of a cache miss by just performing addition or subtraction so as to perform correction processing on an execution time with respect to an instruction for which an execution result is different from a predicted one, or by just adding an execution time obtained upon performing a simulation based on the predicted result with respect to the other instructions.

FIG. 10D illustrates the magnitude of an error when the number of cycles at the time of a cache miss is obtained by performing a simple addition in a conventional technology, in order to compare to the processing performed in the simulation device 101. As can be seen from FIG. 10D, the delay time of the LDR instruction is added with no change, so there actually occurs an error due to the shift of a timing of executing the MUL instruction whose execution is completed during the execution of the LDR instruction.

The simulation device according to the first embodiment makes it possible to execute a performance simulation on a device that uses different types of memories as main memories because an execution time is corrected using a penalty corresponding to the type of memory to be accessed at the time of a cache miss.

Second Embodiment

In a second embodiment, a helper function calling instruction that calls a helper function that determines the type of memory device of a host code is rewritten with a helper function calling instruction that calls a helper function that does not determine the type of memory device, on the basis of a result of determining the type of memory device. Accordingly, when a simulation device executes the host code again, a determination of the type of memory device is omitted, which results in shortening a simulation time compared to the case of the initial execution.

FIG. 11 is a configuration of a simulation device according to the second embodiment.

The simulation device 2101 has a code conversion unit 2110, a simulation execution unit 2120, and a simulation information collecting unit 2130. The code conversion unit 2110 has a block division unit 2111, a predictive simulation execution unit 2113, and a code generation unit 2115.

The block division unit 2111, the predictive simulation execution unit 2113, the code generation unit 2115, and the simulation information collecting unit 2130 respectively have similar functions to the block division unit 111, the predictive simulation execution unit 113, the code generation unit 115, and the simulation information collecting unit 130 of the first embodiment, so their descriptions are omitted.

The simulation execution unit 2120 has a code execution unit 2121, a correction unit 2123, a determination unit 2125, and an optimization unit 2127.

The code execution unit 2121 is a processing unit that executes a program (target code) using a host code that includes a helper function calling instruction.

When a result of executing an externally depending instruction is different from a set predicted result (unpredicted case), the correction unit 2123 corrects an already-obtained execution time in a predicted case during an execution of a program, so as to obtain an execution time for that instruction on the basis of a result of the determination performed by the determination unit 2125.

The correction unit 2123 performs a correction using, for example, a penalty time given to an externally depending instruction, execution times for instructions executed before and after the externally depending instruction, and a delay time of the immediately precedent instruction. The detailed correction processing will be described later.

When a result of executing an externally depending instruction is different from a set predicted result (unpredicted case), the determination unit 2125 determines the type of main memory to be accessed by a target CPU (DRAM or NVRAM) during an execution of a program.

The optimization unit 2127 optimizes a helper function on the basis of a result of the determination performed by the determination unit 2125. Specifically, on the basis of the result of the determination performed by the determination unit 2125, the optimization unit 2127 replaces the helper function calling instruction that calls a helper function included in a host code with a helper function calling instruction that calls a helper function corresponding to the determination result.

The helper function corresponding to the determination result is a helper function that corrects an execution time (the number of cycles) using, for example, 6 cycles when the determination result is a DRAM because the timing information 301 of FIG. 4 indicates "cache miss (DRAM): 6". The helper function corresponding to the determination result is a helper function that corrects an execution time (the number of cycles) using, for example, 22 cycles when the determination result is an NVRAM because the timing information 301 of FIG. 4 indicates "cache miss (NVRAM): 22".

The simulation device 2101 generates a host code by performing processing similar to the processing of generating a host code according to the first embodiment. However, it is assumed that a helper function that is called by the helper function calling instruction included in the host code generated in the second embodiment is a helper function (with optimization) that will be described later.

The code execution unit 2121 performs simulation processing similar to the simulation processing according to the first embodiment (FIG. 8).

Processing of calling a correction unit (helper function) according to the second embodiment is described below.

Figure 12:
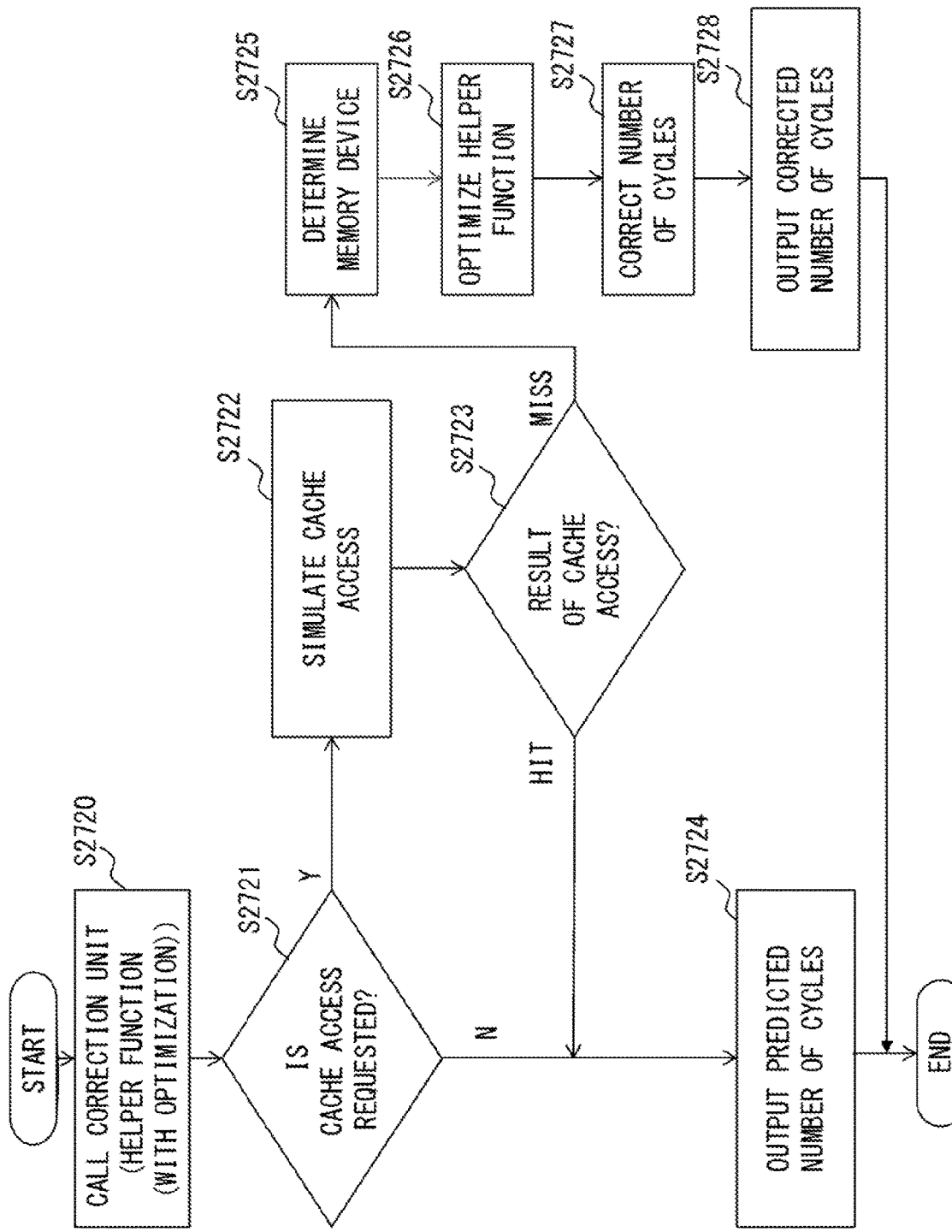
FIG. 12 is a detailed flowchart of processing of calling a correction unit (helper function) according to the second embodiment.

FIG. 12 is a detailed flowchart of the processing of calling a correction unit (helper function) according to the second embodiment. FIG. 12 illustrates processing of determining and correcting a predicted result for processing of a load (LDR) instruction, that is, a main memory (memory) accessing instruction that is an example of an externally depending instruction.

In Step S2720, the code execution unit 2121 calls a helper function (with optimization) designated by a helper function calling instruction. The processes of Steps S2721 to S2728 described below are performed by the called helper function (with optimization). As described below, the helper function (with optimization) rewrites the helper function calling instruction included in a host code corresponding to a result of determining a memory device, using the optimization unit 2127.

The processes of Steps S2721 to S2725, S2727, and S2728 are respectively similar to the processes of Steps S721 to S725, S727, and S728 of the first embodiment, so their descriptions are omitted.

In Step 2726, the optimization unit 2127 rewrites the helper function calling instruction of a host code with a helper function calling instruction that calls a helper function corresponding to the result of the determination (DRAM or NVRAM) in S2725. When the determination result is a DRAM, the helper function corresponding to the determination result is a helper function (DRAM) that corrects an execution time (the number of cycles) using a penalty upon accessing a DRAM at the time of a cache miss. The penalty upon accessing a DRAM is, for example, 6 cycles illustrated in the timing information 301 of FIG. 4. Further, when the determination result is an NVRAM, the helper function corresponding to the determination result is a helper function (NVRAM) that corrects an execution time (the number of cycles) using a penalty upon accessing an NVRAM at the time of a cache miss. The penalty upon accessing an NVRAM is, for example, 22 cycles illustrated in the timing information 301 of FIG. 4.

When the simulation processing is performed again, the code execution unit 2121 executes the host code in which the helper function calling instruction has been rewritten by performing the processing of FIG. 12.

Next, processing is described that is performed when the helper function calling instruction that calls a helper function (with optimization) has been rewritten with a helper function calling instruction that calls a helper function (DRAM).

Figure 13:
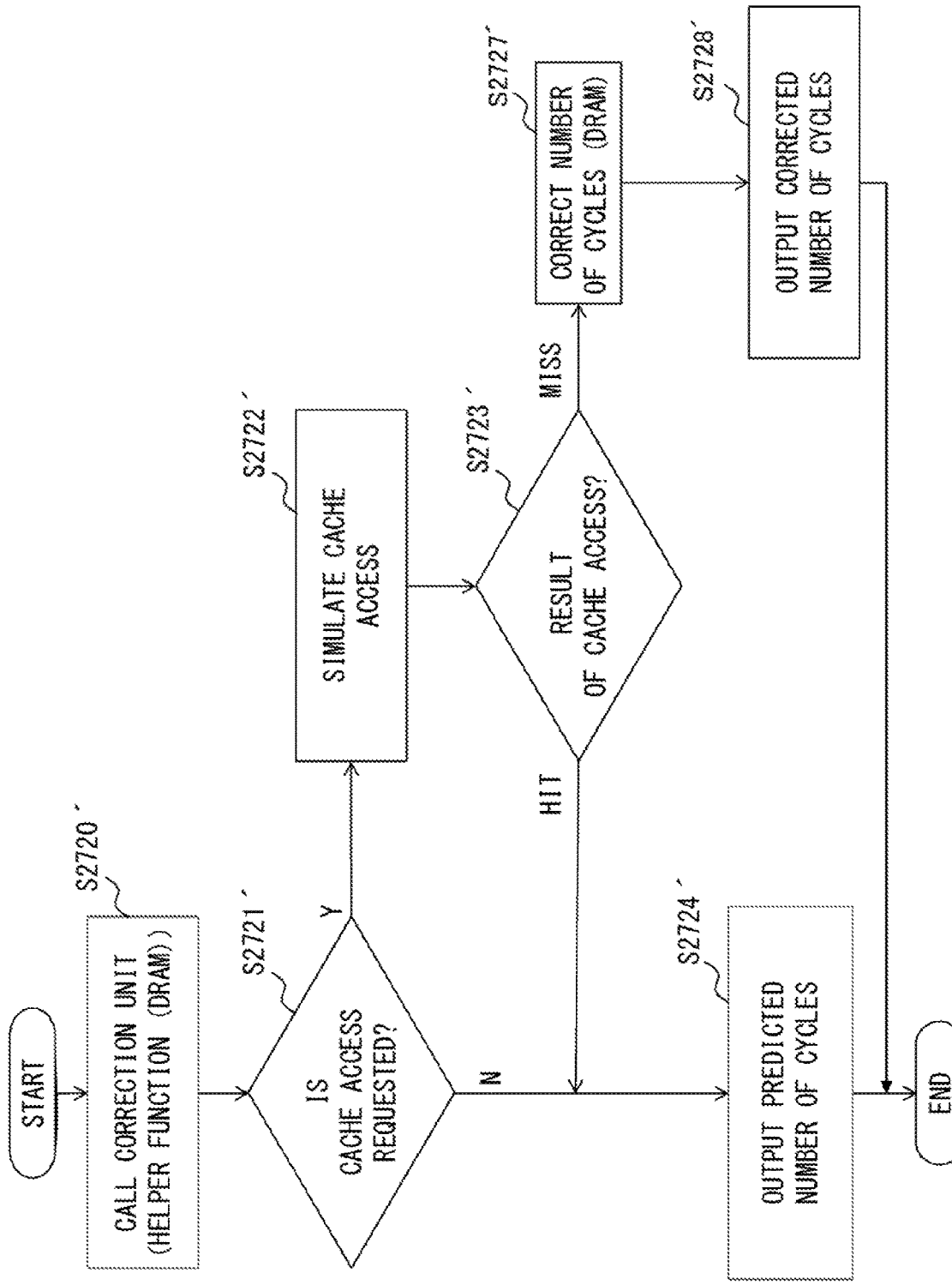
FIG. 13 is a detailed flowchart (part 1) of the processing of calling a correction unit (helper function) after the helper function calling instruction has been rewritten according to the second embodiment.

FIG. 13 is a detailed flowchart (part 1) of the processing of calling a correction unit (helper function) after the helper function calling instruction has been rewritten according to the second embodiment.

In Step S2720', the code execution unit 2121 calls a helper function (DRAM) designated by a helper function calling instruction. The processes of Steps S2721' to S2724', S2727', and S2728' described below are performed by the called helper function (DRAM).

The processes of Steps S2721' to S2724', and S2728' are respectively similar to the processes of Steps S721 to S724, and S728 of the first embodiment, so their descriptions are omitted.

In Step S2727', the correction unit 2123 corrects the execution time (the number of cycles) for the LDR instruction on the basis of the information, in the timing information 301, which indicates a penalty (cycle) for a DRAM at the time of a cache miss (cache miss (DRAM)). For example, the correction unit 2123 corrects the execution time (the number of cycles) using 6 cycles because the timing information 301 of FIG. 4 indicates "cache miss (DRAM): 6".

Next, processing is described that is performed when the helper function calling instruction that calls a helper function (with optimization) has been rewritten with a helper function calling instruction that calls a helper function (NVRAM).

Figure 14:
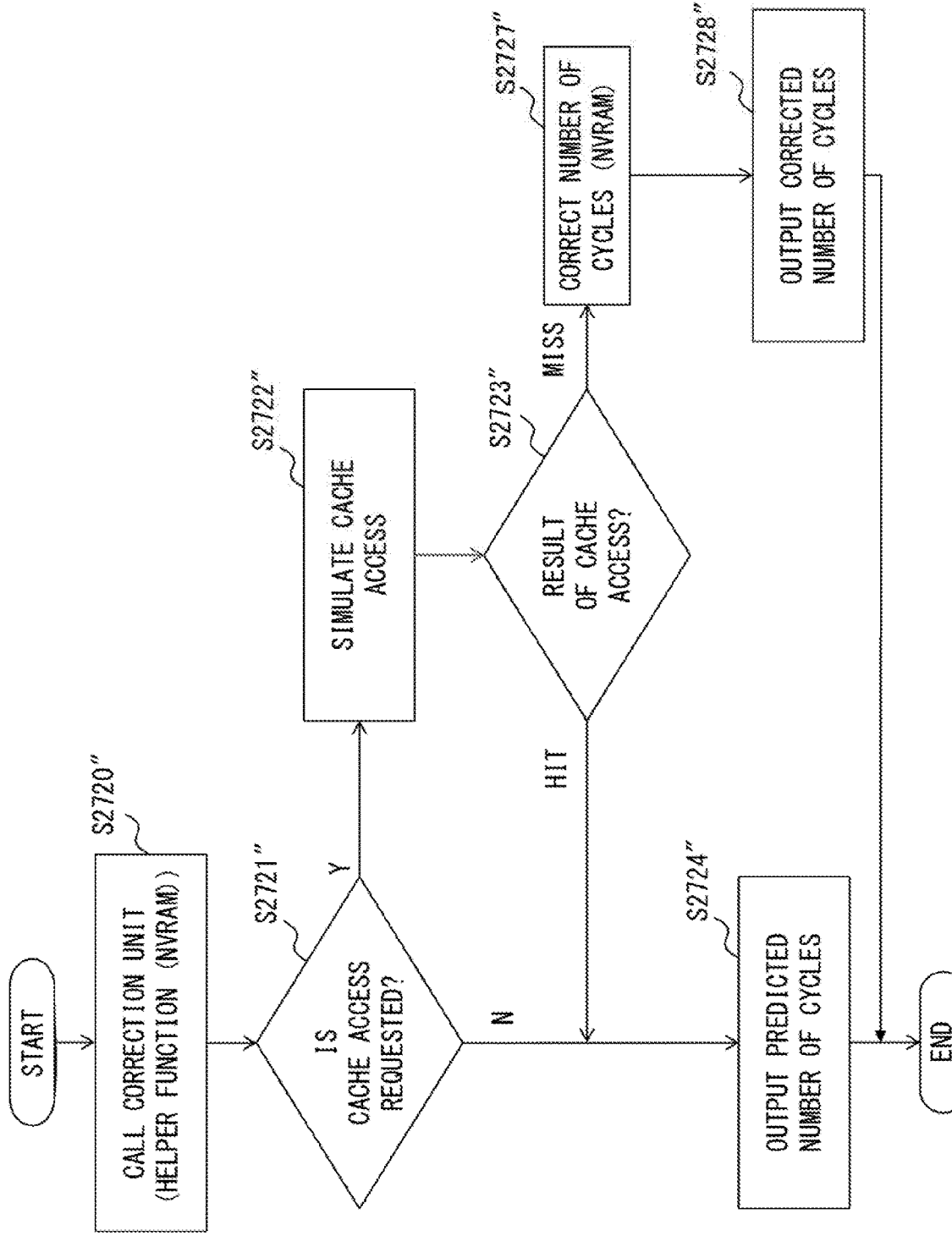
FIG. 14 is a detailed flowchart (part 2) of the processing of calling a correction unit (helper function) after the helper function calling instruction has been rewritten according to the second embodiment.

FIG. 14 is a detailed flowchart (part 2) of the processing of calling a correction unit (helper function) after the helper function calling instruction has been rewritten according to the second embodiment.

In Step S2720', the code execution unit 2121 calls a helper function (NVRAM) designated by a helper function calling instruction. The processes of Steps S2721" to S2724", S2727", and S2728" described below are performed by the called helper function (NVRAM).

The processes of Steps S2721" to S2724", and S2728" are respectively similar to the processes of Steps S721 to S724, and S728 of the first embodiment, so their descriptions are omitted.

In Step S2727", the correction unit 2123 corrects the execution time (the number of cycles) for the LDR instruction on the basis of the information, in the timing information 301, which indicates a penalty (cycle) for an NVRAM at the time of a cache miss (cache miss (NVRAM)). For example, the correction unit 2123 corrects the execution time (the number of cycles) using 22 cycles because the timing information 301 of FIG. 4 indicates "cache miss (NVRAM): 22".

In the simulation device according to the second embodiment, a helper function calling instruction that calls a helper function that determines the type of memory device is rewritten with a helper function calling instruction that calls a helper function that does not determine the type of memory device, on the basis of a result of determining a memory device. Accordingly, the simulation device according to the second embodiment makes it possible to shorten a simulation time because a determination of the type of memory device is not performed when a host code is executed again.

Third Embodiment

For example, when a target CPU is an ARM processor, the target CPU has two operational modes, a kernel mode (a privileged mode) and a user mode. The kernel mode is a mode in which the target CPU operates less restrictedly than in a user mode. The user mode is a mode in which the target CPU operates more restrictedly than in a kernel mode. In a kernel mode, it is possible to access a system area that stores, for example, a kernel.

A simulation device according to a third embodiment generates a host code using a helper function corresponding to the mode of a target CPU.

FIG. 15 is a configuration of a simulation device according to a third embodiment.

A simulation device 3101 has a code conversion unit 3110, a simulation execution unit 3120, and a simulation information collecting unit 3130.

The simulation information collecting unit 3130 has a similar function to the simulation information collecting unit 130 of the first embodiment, so its description is omitted.

The code conversion unit 3110 is a processing unit that generates a code of a host CPU (a host code) that executes a simulation from a code of a program executed by a target CPU (a target code) when the target CPU executes the program.

The code conversion unit 3110 has a block division unit 3111, a predictive-simulation execution unit 3113, and a code generation unit 3115.

The block division unit 3111 has a similar function to the block division unit 111 of the first embodiment, so its description is omitted.

The predictive-simulation execution unit 3113 sets, on the basis of the prediction information 401, a predicted result for an externally depending instruction included in an input block, refers to the timing information 301, and executes an instruction based on the assumption of the set predicted result (predicted case), so as to execute a simulation on the progress of the instruction execution. As a simulation result, the predictive-simulation execution unit 3113 obtains an execution time (the number of cycles needed) for each instruction included in the block. The predictive-simulation execution unit 3113 determines the mode of the target CPU upon executing the externally depending instruction.

The code generation unit 3115 is a processing unit that generates a host code (a host code for performance simulation) on the basis of a result of the simulation performed by the predictive-simulation execution unit 3113, the host code corresponding to the processed block and being used to execute a performance simulation upon executing an instruction in the set predicted case.

The code generation unit 3115 generates, on the basis of the target code of the block, a host code used to execute an instruction in a predicted case in which the externally depending instruction corresponds to the predicted result, adds an execution time for each instruction, and incorporates a code for simulation that performs processing of calculating the time to process the block.

For example, with respect to processing for which "cache hit" is set to be a predicted result for an LDR instruction of data, the code generation unit 3115 generates a host code that simulates a processing execution when a cache access made by the LDR instruction in the block is "hit" so as to obtain an execution time in this predicted case, and generates a host code that performs correction calculation so as to obtain an execution time when a cache access made by the LDR instruction is "miss", the correction calculation using an addition to/a subtraction from the execution time in the predicted case "hit".

The code generation unit 3115 incorporates a code for cycle simulation into the host code (only a function code) obtained by converting the target code, the code for cycle simulation being used to execute a performance simulation (cycle simulation). On the basis of a result of the determination of the mode of the target CPU, the code generation unit 3115 incorporates a code for cycle simulation that includes a helper function calling instruction that calls a helper function.

The simulation execution unit 3120 has a code execution unit 3121, a correction unit 3123, a determination unit 3125, and an optimization unit 3127.

The code execution unit 3121 is a processing unit that executes a program (target code) using a host code that includes a helper function calling instruction.

When a result of executing an externally depending instruction is different from a set predicted result (unpredicted case), the correction unit 3123 corrects an already-obtained execution time in a predicted case during an execution of a program, so as to obtain an execution time for that instruction on the basis of a result of the determination performed by the determination unit 3125.

The correction unit 3123 performs a correction using, for example, a penalty time given to an externally depending instruction, execution times for instructions executed before and after the externally depending instruction, and a delay time of the immediately precedent instruction. The correction unit 3123 has both of the functions of the correction unit 123 of the first embodiment and the correction unit 2123 of the second embodiment.

When a result of executing an externally depending instruction is different from a set predicted result (unpredicted case), the determination unit 3125 determines the type of main memory to be accessed by a target CPU (DRAM or NVRAM) during an execution of a program.

The optimization unit 3127 optimizes a helper function on the basis of a result of the determination performed by the determination unit 3125. Specifically, on the basis of the result of the determination performed by the determination unit 3125, the optimization unit 3127 replaces the helper function calling instruction that calls a helper function included in a host code with a helper function calling instruction that calls a helper function corresponding to the determination result. The optimization unit 3127 has a similar function to the optimization unit 2127 of the second embodiment.

Processing of generating a host code according to the third embodiment is described below.

FIG. 16 is a flowchart of processing of generating a host code that is performed in the simulation device according to the third embodiment.

In Step S751, the block division unit 3111 divides a code of a target program (target code) into a prescribed unit of blocks.

In Step S752, the predictive-simulation execution unit 3113 analyzes instructions in a block so as to detect an externally depending instruction. The predictive-simulation execution unit 3113 determines a mode of the target CPU upon executing the externally depending instruction. The mode of the target CPU is determined by referring to the internal state of the target CPU (system control register). Alternatively, the mode of the target CPU is determined on the basis of an address that stores an instruction.

In Step S753, with respect to each of the detected instructions, the predictive-simulation execution unit 3113 determines, to be a predicted case, an execution result that is more likely to occur, on the basis of the prediction information 401.

In Step S754, the predictive-simulation execution unit 3113 refers to the timing information 301 so as to execute a performance simulation based on the assumption of the execution result set to be a predicted result for each of the instructions in the block.

In Step S755, the code generation unit 3115 generates a host code for performance simulation on the basis of a simulation result and a result of determining a mode of the target CPU, the host code for performance simulation being executed by the simulation execution unit 3120. For example, when the result of determining a mode of the target CPU is a kernel mode, the code generation unit 3115 generates a host code for performance simulation including the helper function calling instruction that calls a helper function (with determination processing) that has been described in the first embodiment. For example, when the result of determining a mode of the target CPU is a user mode, the code generation unit 3115 generates a host code for performance simulation including the helper function calling instruction that calls a helper function (with optimization) that has been described in the second embodiment.

A host code in which a code that executes a simulation on a performance of a target CPU has been incorporated into a functional code in the case of the set execution result (predicted case) is output by performing the processes of Steps S751 to S755 described above.

In the simulation device according to the third embodiment, a mode of a target CPU is determined and a host code is generated that includes a helper function calling instruction that calls a helper function corresponding to a determination result. For example, both a DRAM and an NVRAM are accessed when the mode of the target CPU is a kernel mode, so a host code is generated that includes a helper function calling instruction that calls a helper function (with determination processing). Both a DRAM and an NVRAM are accessed when the mode of the target CPU is a kernel mode, so it is possible to perform an accurate simulation if a helper function that determines the type of memory device is used.

Figure 17:
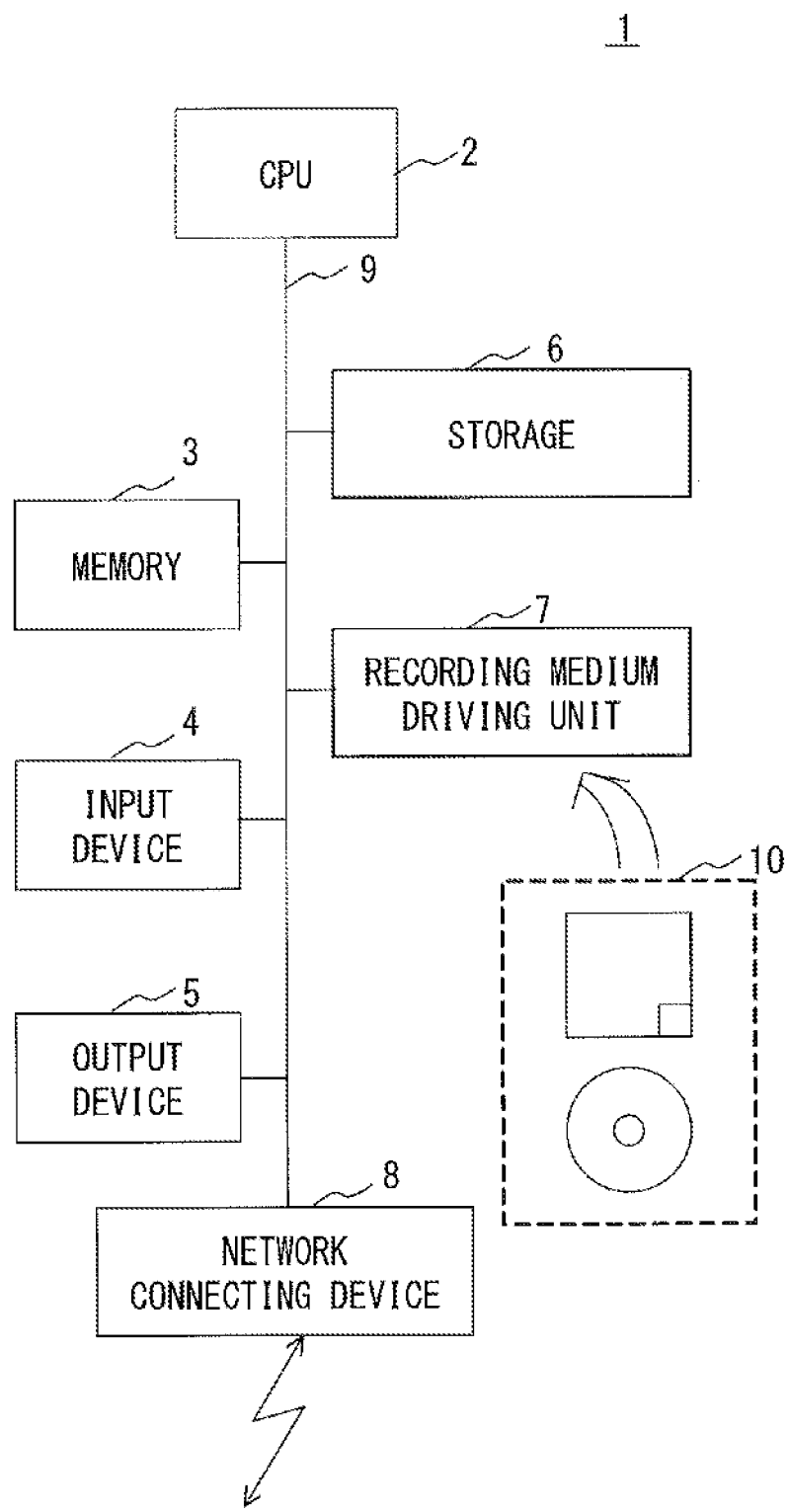
FIG. 17 is a configuration of an information processing device (a computer).

FIG. 17 is a configuration of an information processing device (a computer).

The simulation devices 101, 2101, and 3101 according to the embodiments can be realized by, for example, an information processing device (a computer) 1 as illustrated in FIG. 17.

The information processing device 1 includes a CPU 2, a memory 3, an input device 4, an output device 5, a storage 6, a recording medium driving unit 7, and a network connecting device 8, and these components are connected to one another via a bus 9.

The CPU 2 is a central processing unit that controls the entirety of the information processing device 1. The CPU 2 operates as the code conversion unit 110, 2110, 3110, the simulation execution unit 120, 2120, 3120, and the simulation information collecting unit 130, 2130, 3130. The CPU 2 is an example of a processor.

The memory 3 is a memory such as a read only memory (ROM) and a random access memory (RAM) which temporarily stores, upon executing a program, the program or data that is stored in the storage 6 (or a portable recording medium 10). The CPU 2 executes the program using the memory 3, so as to perform the variety of processes described above.

In this case, a program code itself that is read from, for example, the portable recording medium 10 realizes the functions of the embodiments.

The input device 4 is, for example, a keyboard, a mouse, a touch panel, a camera, or a sensor, and is used, for example, for inputting instructions or information from a user or an operator, or obtaining data used in the information processing device 1.

The output device 5 is, for example, a display or a printer. The output device 5 is a device that operates by a control performed by the CPU 2, and that outputs inquiries to the user or the operator or outputs a result of processing.

The storage 6 is, for example, a magnetic disk device, an optical disk device, or a tape device. The information processing device 1 stores the above-described program and data in the storage 6 so as to load them into the memory 3 and use them as needed. The memory 3 and the storage 6 store the target program 201, the timing information 301, the prediction information 401, and the simulation information 501.

The recording medium driving unit 7 drives the portable recording medium 10 so as to access the recorded content. Any computer-readable recording medium such as a memory card, a flexible disk, a compact disk read only memory (CD-ROM), an optical disc, or a magneto-optical disk may be used as a portable recording medium. The user stores the above-described program and data in the portable recording medium 10 so as to load them into the memory 3 and use them as needed.

The network connecting device 8 is a communication interface that is connected to a communication network such as a local area network or a wide area network and makes a data conversion associated with communication. The network connecting unit 8 transmits/receives data to/from a device that is connected to the network connecting unit 8 through a communication network.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a simulation program that causes a computer to execute a process that includes a simulation of an instruction execution of a program for a target processor, the process comprising:

setting, to be a predicted result, an execution result of processing a memory access instruction that is included in a code of the program;

executing a functional simulation of an instruction execution based on an assumption of the predicted result, and obtaining timing information that indicates a timing of executing the memory access instruction, so as to calculate an execution time for the memory access instruction in the case of the predicted result, on the basis of a result of the functional simulation and the timing information;

generating a host code on the basis of the result of the functional simulation, the host code including the memory access instruction and being used to execute a performance simulation of an instruction execution based on the assumption of the predicted result;

executing the generated host code;

determining a type of memory to be accessed in the memory access instruction when a result of executing a cache access in the memory access instruction included in the host code is different from the predicted result; and correcting an execution time for the memory access instruction in the case of the predicted result using a correction value corresponding to a result of determining the type of the memory, so as to obtain an execution time for the memory access instruction in the functional simulation, the target processor has a first mode and a second mode in which the target processor operates more restrictedly than in the first mode, when the target processor upon executing the memory access instruction is in the first mode, the generating the host code generates the host code that causes processing to be executed, the processing including: determining the type of the memory to be accessed in the memory access instruction when a result of executing a cache access in the memory access instruction included in the host code is different from the predicted result main memory; and correcting an execution time for the memory access instruction in the case of the predicted result using a correction value corresponding to a result of determining the type of the memory, so as to obtain an execution time for the memory access instruction in the functional simulation, and when the target processor upon executing the memory access instruction is in the second mode, the generating the host code generates the host code that causes processing to be executed, the processing including: determining a type of the memory to be accessed in the memory access instruction when a result of executing a cache access in the memory access instruction included in the host code is different from the predicted result main memory; correcting an execution time for the memory access instruction in the case of the predicted result using a correction value corresponding to a result of determining the type of the memory, so as to obtain an execution time for the memory access instruction in the functional simulation; and rewriting the host code based on the result of determining the type of the memory such that processing is executed without determining the type of the memory to be accessed in the memory access instruction, the processing including correcting an execution time for the memory access instruction in the case of the predicted result using the correction value corresponding to the result of determining the type of the memory, so as to obtain an execution time for the memory access instruction in the functional simulation.

2. An information processing device that executes a simulation of an instruction execution of a program for a target processor, the information processing device comprising a processor that
  sets, to be a predicted result, an execution result of processing a memory access instruction that is included in a code of the program,
  executes a functional simulation of an instruction execution based on an assumption of the predicted result, and obtains timing information that indicates a timing of executing an instruction included in the memory access instruction, so as to calculate an execution time for the memory access instruction in the case of the predicted result, on the basis of a result of the functional simulation and the timing information,
  generates a host code on the basis of the result of the functional simulation, the host code including the memory access instruction and being used to execute a performance simulation of an instruction execution based on the assumption of the predicted result,
  executes the generated host code,
  determines a type of memory to be accessed in the memory access instruction when a result of executing a cache access in the memory access instruction included in the host code is different from the predicted result, and
  corrects an execution time for the memory access instruction in the case of the predicted result using a correction value corresponding to a result of determining the type of the memory, so as to obtain an execution time for the memory access instruction in the functional simulation,
  the target processor has a first mode and a second mode in which the target processor operates more restrictedly than in the first mode,
  when the target processor upon executing the memory access instruction is in the first mode, the generating the host code generates the host code that causes processing to be executed, the processing including: determining the type of the memory to be accessed in the memory access instruction when a result of executing a cache access in the memory access instruction included in the host code is different from the predicted result main memory; and correcting an execution time for the memory access instruction in the case of the predicted result using a correction value corresponding to a result of determining the type of the memory, so as to obtain an execution time for the memory access instruction in the functional simulation, and
  when the target processor upon executing the memory access instruction is in the second mode, the generating the host code generates the host code that causes processing to be executed, the processing including: determining a type of the memory to be accessed in the memory access instruction when a result of executing a cache access in the memory access instruction included in the host code is different from the predicted result main memory; correcting an execution time for the memory access instruction in the case of the predicted result using a correction value corresponding to a result of determining the type of the memory, so as to obtain an execution time for the memory access instruction in the functional simulation; and rewriting the host code based on the result of determining the type of the memory such that processing is executed without determining the type of the memory to be accessed in the memory access instruction, the processing including correcting an execution time for the memory access instruction in the case of the predicted result using the correction value corresponding to the result of determining the type of the memory, so as to obtain an execution time for the memory access instruction in the functional simulation.

3. A simulation method executable by a computer that executes a simulation of an instruction execution of a program for a target processor, the method comprising:
  setting, to be a predicted result, an execution result of processing a memory access instruction that is included in a code of the program;
  executing a functional simulation of an instruction execution based on the assumption of the predicted result, and obtaining timing information that indicates a timing of executing the memory access instruction, so as to calculate an execution time for the memory access instruction in the case of the predicted result, on the basis of a result of the functional simulation and the timing information;
  generating a host code on the basis of the result of the functional simulation, the host code including the memory access instruction and being used to execute a performance simulation of an instruction execution based on the assumption of the predicted result;
  executing the generated host code, and determining a type of memory to be accessed in the memory access instruction when a result of executing a cache access in the memory access instruction included in the host code is different from the predicted result; and
  correcting an execution time for the memory access instruction in the case of the predicted result using a correction value corresponding to a result of determining the type of the memory, so as to obtain an execution time for the memory access instruction in the functional simulation,
  the target processor has a first mode and a second mode in which the target processor operates more restrictedly than in the first mode,
  when the target processor upon executing the memory access instruction is in the first mode, the generating the host code generates the host code that causes processing to be executed, the processing including: determining the type of the memory to be accessed in the memory access instruction when a result of executing a cache access in the memory access instruction included in the host code is different from the predicted result main memory; and correcting an execution time for the memory access instruction in the case of the predicted result using a correction value corresponding to a result of determining the type of the memory, so as to obtain an execution time for the memory access instruction in the functional simulation, and
  when the target processor upon executing the memory access instruction is in the second mode, the generating the host code generates the host code that causes processing to be executed, the processing including: determining a type of the memory to be accessed in the memory access instruction when a result of executing a cache access in the memory access instruction included in the host code is different from the predicted result main memory; correcting an execution time for the memory access instruction in the case of the predicted result using a correction value corresponding to a result of determining the type of the memory, so as to obtain an execution time for the memory access instruction in the functional simulation; and rewriting the host code based on the result of determining the type of the memory such that processing is executed without determining the type of the memory to be accessed in the memory access instruction, the processing including correcting an execution time for the memory access instruction in the case of the predicted result using the correction value corresponding to the result of determining the type of the memory, so as to obtain an execution time for the memory access instruction in the functional simulation.

* * * * *